US006625162B2

(12) United States Patent
Myojo et al.

(10) Patent No.: US 6,625,162 B2
(45) Date of Patent: *Sep. 23, 2003

(54) METHOD AND APPARATUS FOR DATA TRANSMISSION WITH CONTROL OVER ACCESS TO A TRANSMISSION MEDIUM

(75) Inventors: Toshihiko Myojo, Yokohama (JP); Tetsuo Kanda, Kawasaki (JP); Kazuo Moritomo, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/208,404

(22) Filed: Dec. 10, 1998

(65) Prior Publication Data
US 2002/0037014 A1 Mar. 28, 2002

(30) Foreign Application Priority Data
Dec. 17, 1997 (JP) .............................. 9-348305

(51) Int. Cl.[7] ............................................. H04L 12/413
(52) U.S. Cl. ........................ 370/445; 370/448; 455/517
(58) Field of Search ................................. 370/445, 236, 370/447, 468, 448, 476, 461, 347, 462, 348, 338, 466, 467; 455/517; 359/136; 714/749.18

(56) References Cited

U.S. PATENT DOCUMENTS

| 4,598,285 | A | * | 7/1986 | Hoshen ....................... 370/448 |
| 5,369,639 | A | * | 11/1994 | Kamerman et al. ......... 370/445 |
| 5,383,185 | A | * | 1/1995 | Armbruster et al. ........ 370/447 |
| 5,422,887 | A | * | 6/1995 | Diepstraten et al. ........ 370/447 |
| 5,436,903 | A | * | 7/1995 | Yang et al. .................. 370/448 |
| 5,446,735 | A | * | 8/1995 | Tobagi et al. ............... 370/445 |
| 5,526,355 | A | * | 6/1996 | Yang et al. .................. 370/448 |
| 5,533,025 | A | * | 7/1996 | Fleek et al. ................. 370/448 |
| 5,537,414 | A | * | 7/1996 | Takiyasu et al. ............ 370/347 |
| 5,600,651 | A | * | 2/1997 | Molle .......................... 370/448 |
| 5,706,274 | A | * | 1/1998 | Angelico et al. ........... 370/445 |
| 5,721,725 | A | * | 2/1998 | Want et al. .................. 370/236 |
| 5,771,462 | A | * | 6/1998 | Olsen .......................... 455/517 |
| 5,774,468 | A | * | 6/1998 | Maruyama et al. ......... 370/462 |
| 5,774,479 | A | * | 6/1998 | Lee et al. .................... 714/749 |
| 5,828,663 | A | * | 10/1998 | Ikegami ...................... 370/448 |
| 5,854,700 | A | * | 12/1998 | Ota ............................. 359/136 |
| 5,949,776 | A | * | 9/1999 | Mahany et al. ............. 370/338 |
| 6,172,983 | B1 | * | 1/2001 | Shaffer et al. .............. 370/446 |
| 6,192,053 | B1 | * | 2/2001 | Angelico et al. ........... 370/448 |
| 6,240,083 | B1 | * | 5/2001 | Wright et al. ............... 370/348 |

* cited by examiner

Primary Examiner—Steven Nguyen
Assistant Examiner—Phuongchau Ba Nguyen
(74) Attorney, Agent, or Firm—Fitzpatrick, Cella, Harper & Scinto

(57) ABSTRACT

In a communication system including plural communication apparatuses that communicate each other using a single communication path, the state of the communication path is detected for communication. If the communication path is busy, a first control method is performed for controlling access to the communication path using a back off time selected at random. A second control method secures the communication path by transmitting and receiving the predetermined signal at transmission of a signal so as to control access to the communication path. In accordance with the kind of the signal to be transmitted, the first or the second control method is selected for communication. Thus, plural communication apparatuses can perform efficient communication.

6 Claims, 24 Drawing Sheets

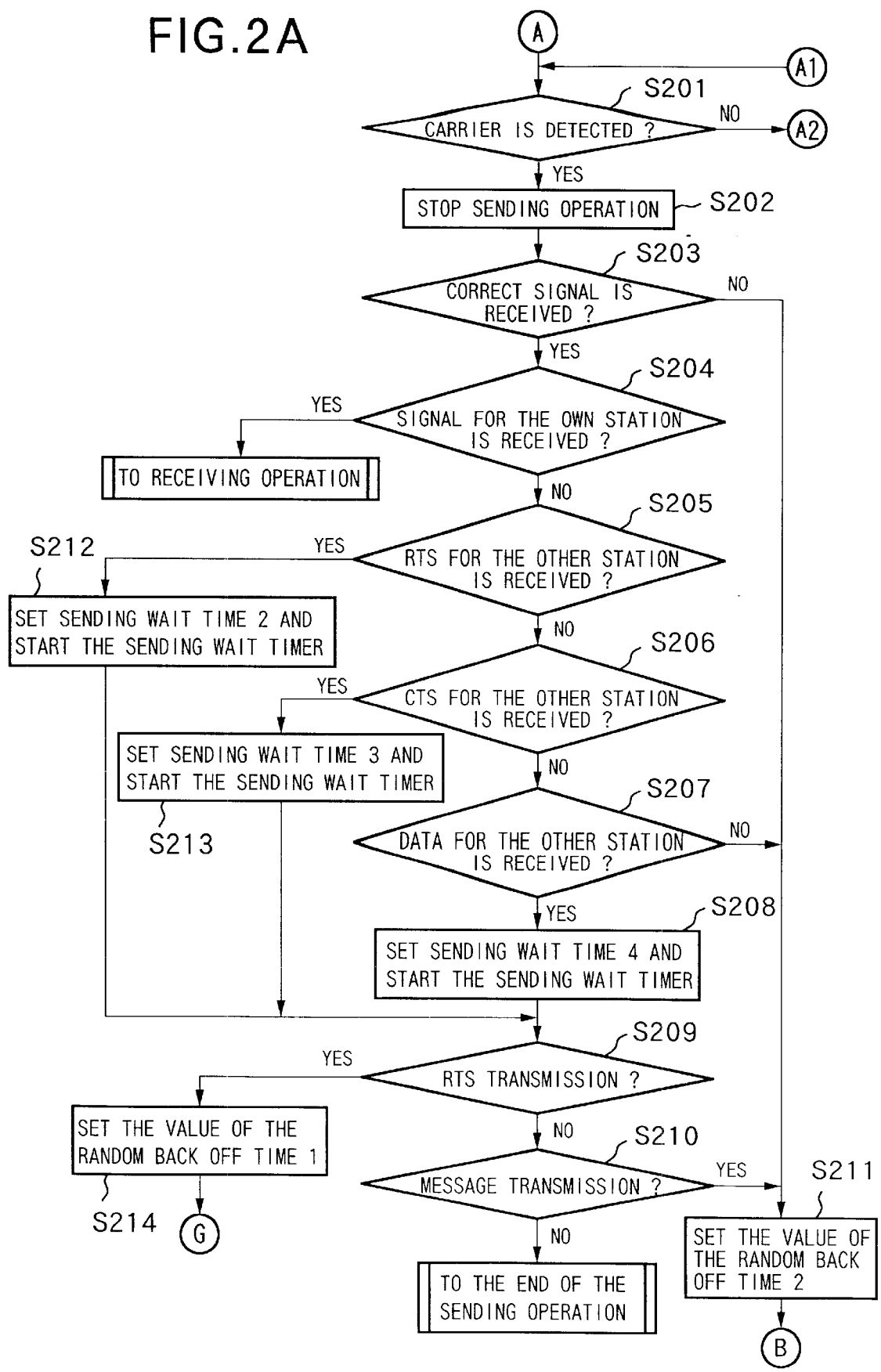

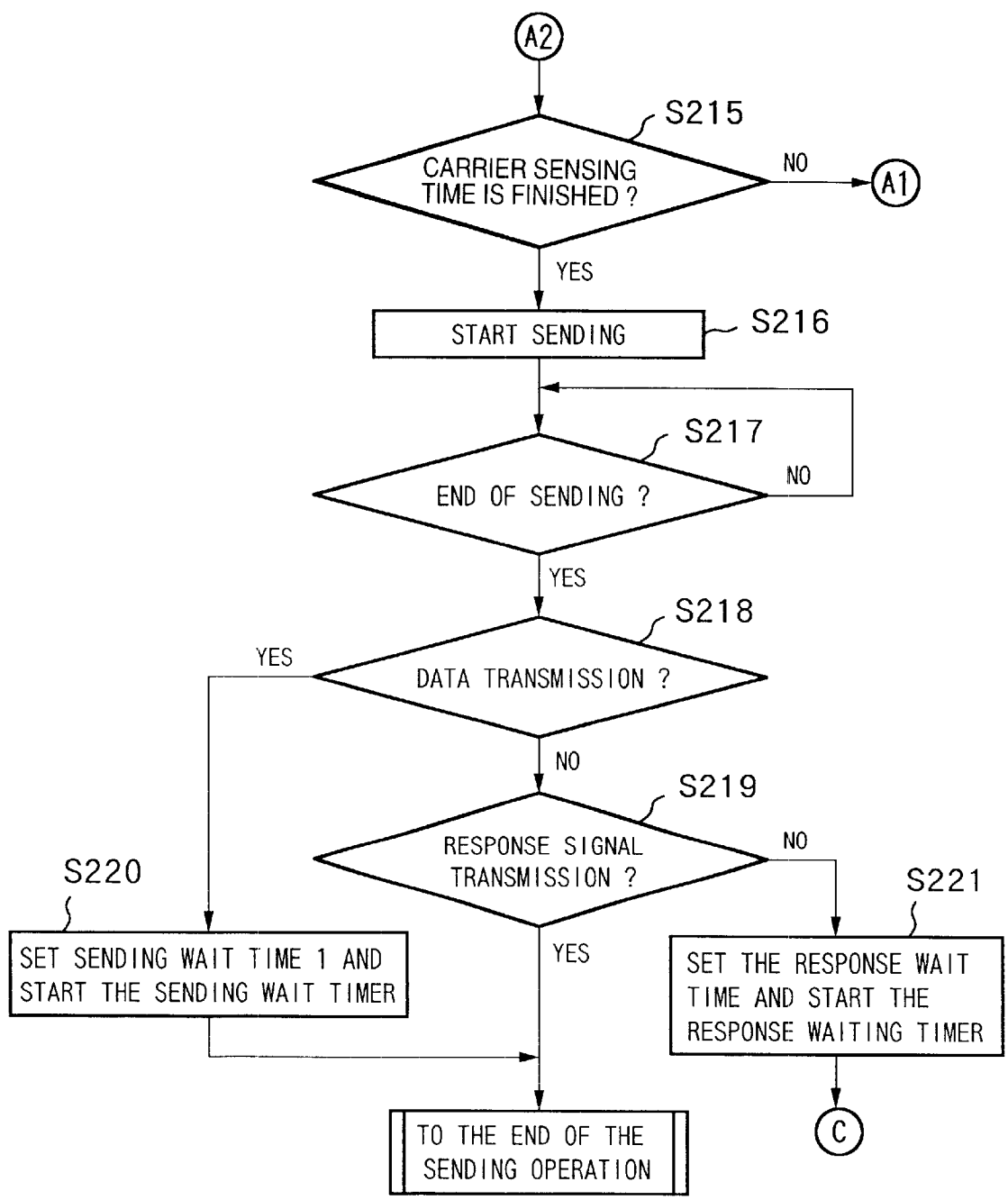

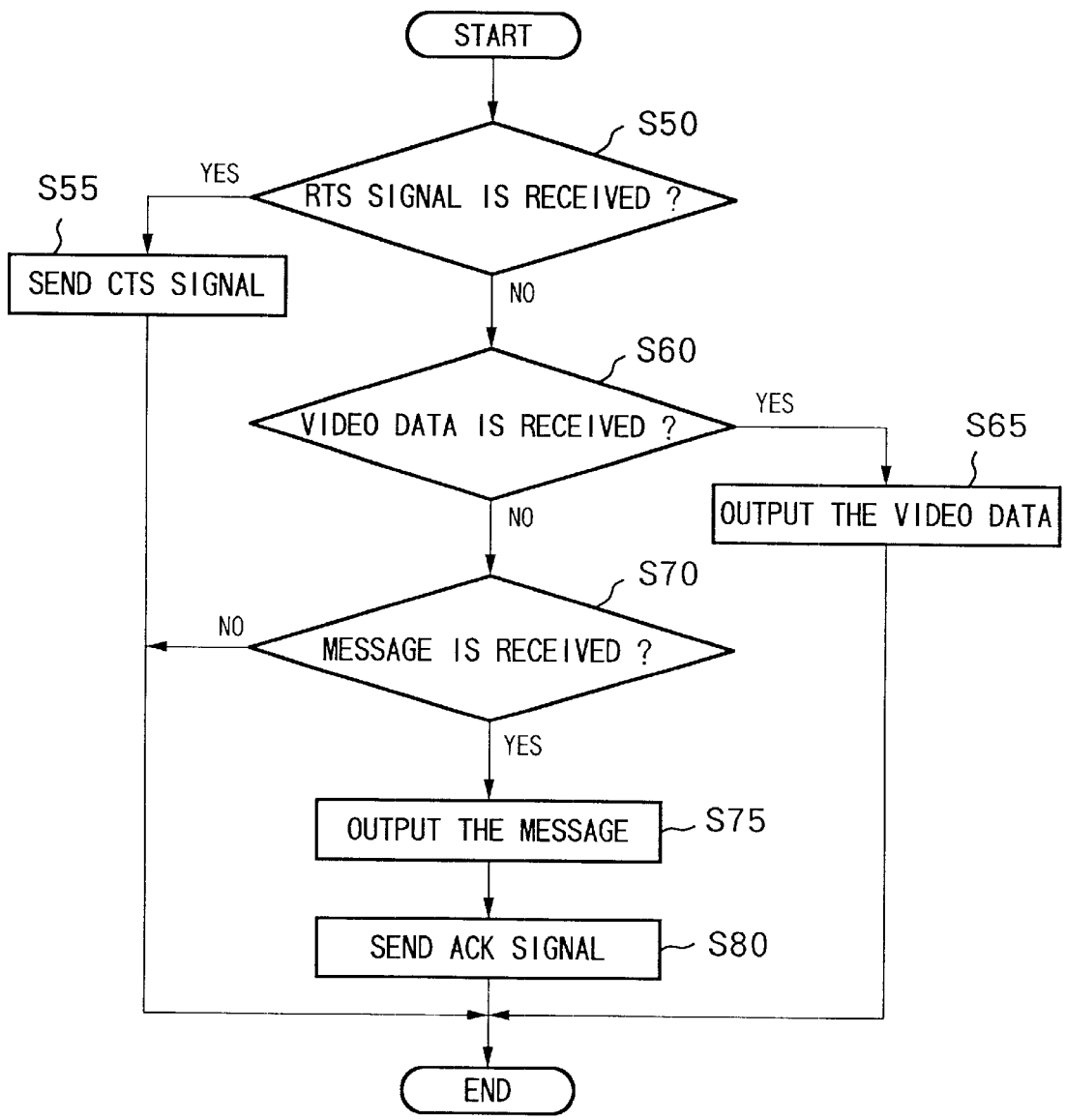

METHOD AND APPARATUS FOR DATA TRANSMISSION WITH CONTROL OVER ACCESS TO A TRANSMISSION MEDIUM

BACKGROUND OF THE INVENTION

1. Field of the Invention

The present invention relates to a communication system, a communication apparatus and a method for controlling the apparatus for communicating large amount of image data by asynchronous TDMA wireless communication.

2. Description of the Related Art

In a wireless data communication system for plural stations to perform asynchronous communication with each other using the same frequency carrier, time division multiple access (TDMA) method is widely used, in which each of the stations performs time division communication. On this occasion, wireless medium access control is performed to access the wireless path.

For example, in a wireless LAN system, plural asynchronous communicating stations can coexist by performing access control using carrier sense multiple access with collision avoidance (CSMA/CA) and back off time in which a medium is selected at random after busy state (hereinafter, referred to a random back off time).

The CSMA/CA procedure confirms the state of the medium by sensing carrier when starting transmission, and sends an electric wave to the wireless medium only when the carrier has not been detected in the medium for a predetermined period. If the carrier is detected, carrier sensing is continued. When the carrier becomes not detected the transmission operation including the carrier sensing is restarted after waiting transmission for a period corresponding to the random back off time.

In addition, the sending station further sends the request to send (RTS) signal, the clear to send (CTS) signal, and the acknowledge (ACK) signal for dealing with so-called hidden terminal problem, in which the other station existing in a location where it cannot sense carrier causes interference in a location of receiving station. Thus, imaginary carrier detection means are realized that normally confirm the response from the other station in data communication.

The above-mentioned system performs collision avoidance by the carrier sensing and the random back off procedure, and further detects collision by the reception confirming response means. However, the system still has high possibility to cause the collision when the hidden terminal exists and the detection is difficult in carrier sensing as mentioned above. It is a problem when the hidden terminal exists that the collision cannot be avoided even if the collision is detected by the reception confirming response means, and the collision causes drop of throughput due to resending procedure after the collision.

In addition, there is another problem that the influence of the overhead may become large if the traffic is not uniform when using RTS/CTS procedure.

SUMMARY OF THE INVENTION

An object of the present invention is to solve the above-mentioned problems. The present invention provides a communication system, a communication apparatus and a method for controlling the apparatus, in which plural stations can communicate efficiently by controlling access to the transmission path in accordance with the signal to be sent.

A communication system according to the present invention is for plural communication apparatuses to communicate each other using a single communication path. The system includes first control means for detecting the state of the communication path at transmission of a signal, and for controlling access to the communication path using a back off time selected at random when the communication path is busy, second control means for securing the communication path by sending and receiving a predetermined signal at transmission of the signal, and for controlling the access to the communication path, and communication means for selecting the first or the second control means in accordance with the signal to be sent for communication.

In another aspect, a communication apparatus according to the present invention includes first control means for detecting the state of the communication path, and for controlling access to the communication path using a back off time selected at random when the communication path is busy, second control means for controlling the access to the communication path by sending and receiving the RTS signal and the sending permission signal, and communication means for selecting the first or the second control means in accordance with the signal to be transmitted.

In still another aspect, a method for controlling a communication apparatus according to the present invention is for plural communication apparatuses to communicate each other using a single communication path. The method includes first control step of detecting the state of the communication path, and controlling access to the communication path using a back off time selected at random when the communication path is busy, second control step of controlling the access to the communication path by sending and receiving the RTS signal and the sending permission signal, and third control step of controlling so as to select the first or the second control step for communication in accordance with the signal to be sent.

Other objects of the present invention will be cleared by the detailed description explained below with reference to the accompanied drawings.

BRIEF DESCRIPTION OF THE DRAWINGS

FIGS. 2A and 2B are flowcharts of sending control in accordance with the embodiment of the present invention;

FIG. 23 is a flowchart of the operation when a signal is inputted from the RF unit.

DESCRIPTION OF THE PREFERRED EMBODIMENTS

Hereinafter, preferred embodiments of the present invention will be described with reference to the accompanying drawings.

Figure 21:
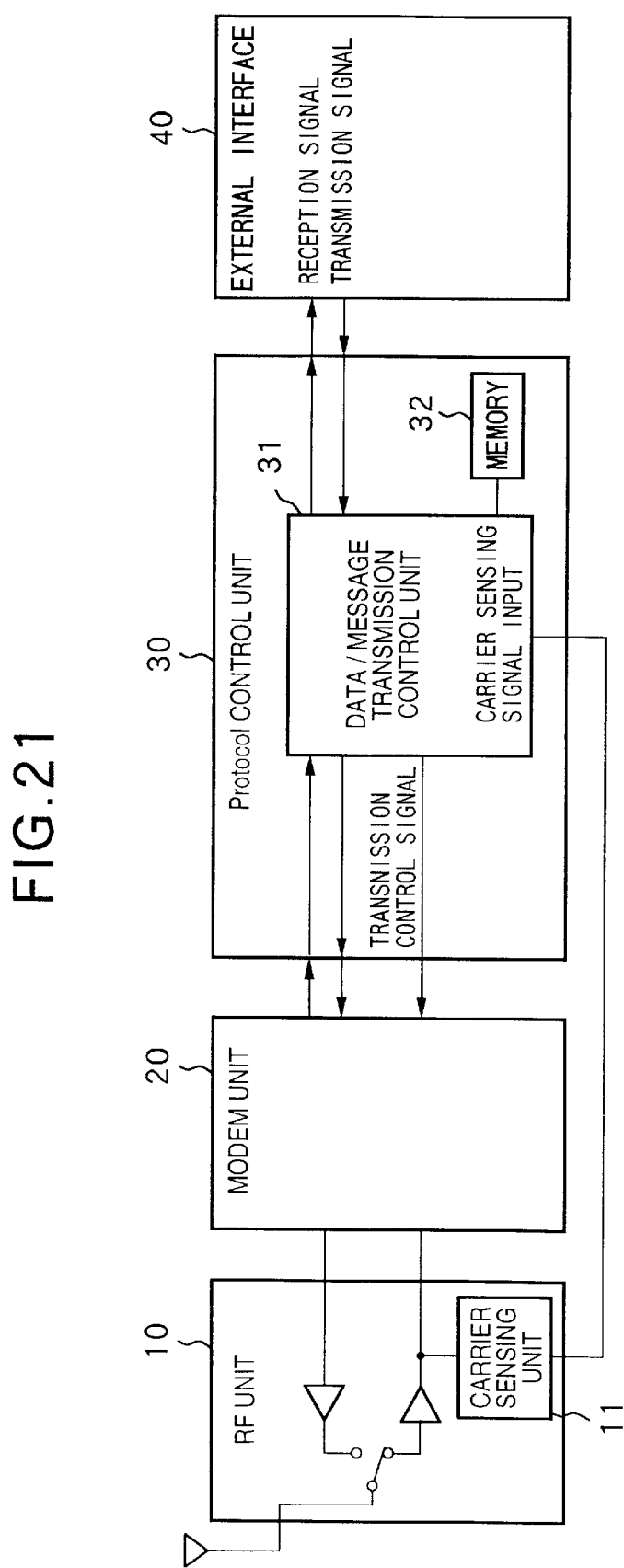
FIG. 21 is a block diagram of a communication apparatus according to an embodiment of the present invention.

FIG. 21 is a block diagram of a communication apparatus according to an embodiment of the present invention.

Numeral 10 denotes a radio frequency (RF) unit that includes a carrier transmission unit 11. Numeral 20 denotes a modem unit. Numeral 30 is a protocol control unit that includes a data/message transmission control unit 31 and a memory 32. Numeral 40 is an external interface that may be connected to a video camera, a video display, video memory or other external devices that send and receive video data and message. If the video camera, the video display, the video memory and other devices include the RF unit 10, the modem 20, and the protocol control unit 30 that are built in the devices, the principal control unit of the video camera, the video display, the video memory and other devices may be connected to the protocol control unit 30, instead of the external interface 40. The data/message transmission control unit 31 is so-called a microcomputer that works in accordance with a program stored in the memory 32. The above-mentioned message may includes a control command such as a zooming command for the video camera and a warning command indicating little remaining power of a battery of the video camera, and others.

The operation procedure of the data/message transmission control unit 31 when video data or message is inputted into the data/message transmission control unit 31 via the external interface 40 will be explained in accordance with a flowchart. This flowchart illustrates a part of the program stored in the memory 32. The same operation is performed when the video data or the message is inputted via the principal control unit of the video device bypassing the external interface 40.

Figure 1:
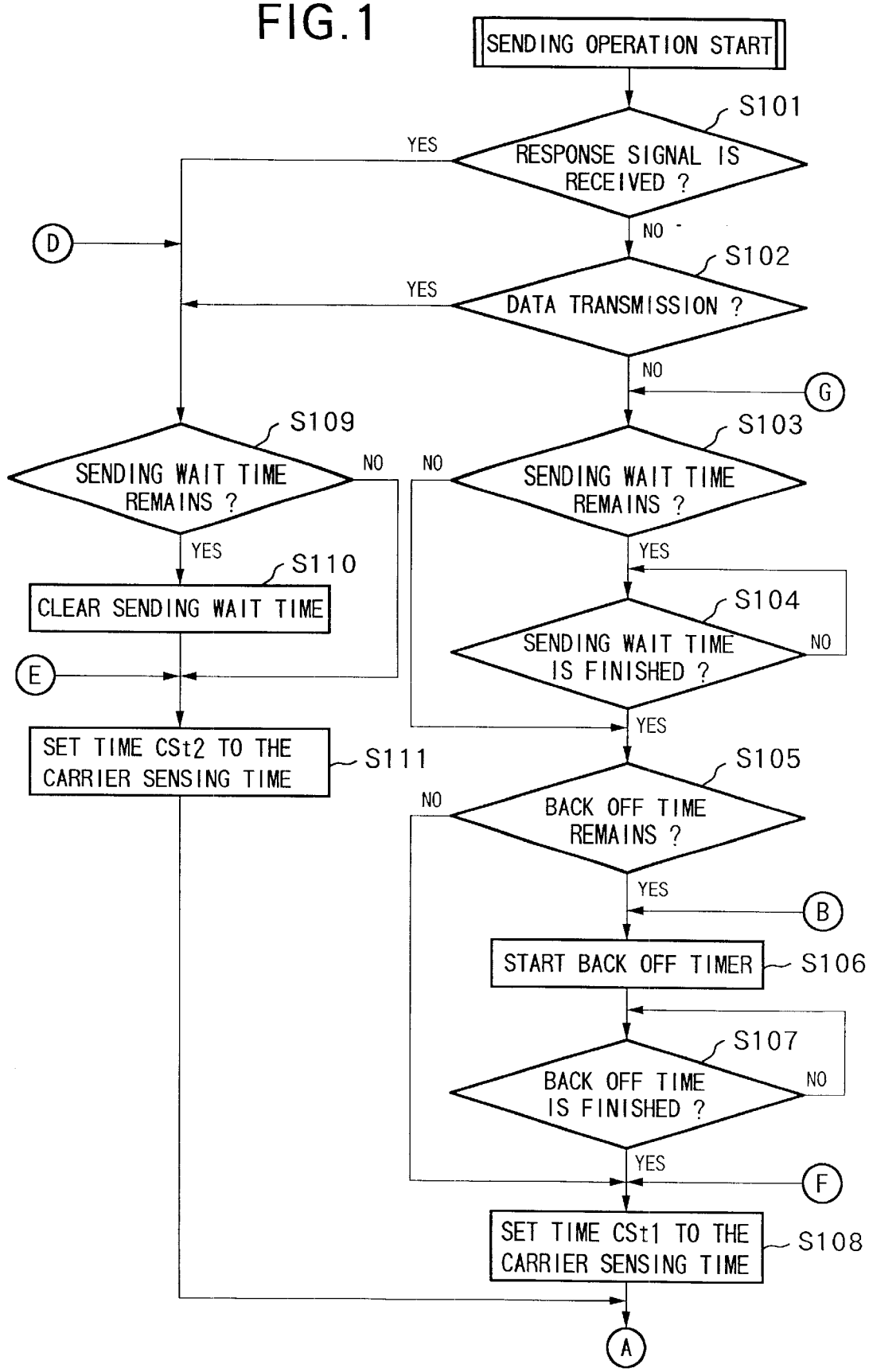
FIG. 1 is a flowchart of sending control in accordance with the embodiment of the present invention.

If the video data is inputted in the step S10, transmission of the RTS signal is instructed in step S30 before sending the video data via the modem unit 20 and the RF unit 10. The RTS signal is transmitted in steps S216 and S217 via step S108 shown in FIG. 1 and steps S201 and S215 shown in FIGS. 2A and 2B. The video data is sent in steps S216 and S217 after transmission of the RTS signal, passing through "NO" of step S218 and "NO" of step S219, step S221, and steps S301 and S302 of FIG. 3A, confirming reception of the CTS signal in step S303, passing through "YES" of step S102 as shown in FIG. 1, step S111, steps S201 and S215 shown in FIGS. 2A and 2B. The sending operation finishes via "YES" of S218 and S220 after the transmission of the video data.

When a message is inputted in step S20, the message sending is instructed in step S40 without sending the RTS signal nor receiving the CTS signal. The message is sent via the modem unit 20 and the RF unit 10 in steps S216 and S217 after passing through step S108 shown in FIG. 1 and steps S201 and S215 shown in FIGS. 2A and 2B. After sending the message, the sending operation is finished by confirming reception of the ACK signal.

The operation procedure of the data/message transmission control unit 31 when the RTS signal, the video data or the message is received via the RF unit 10 and the modem unit 20 will be explained in accordance with a flowchart. This flowchart illustrates a part of the program stored in the memory 32.

When the RTS signal is received in step S50, sending of the CTS signal via the modem unit 20 and the RF unit 10 is requested in step S55. The CTS signal is sent in step S216 after step S111 of FIG. 1 and steps S201 and S215 of FIGS. 2A and 2B.

When the video data is received in step S60, the received video data is outputted to an external device via the external interface 40 in step S65. Alternatively, the video data may be outputted to the principal control unit of the video device bypassing the external interface 40.

When the message is received in step S70, the received message is outputted to an external device via the external interface 40 in step S75. Alternatively, the message may be outputted to the principal control unit of the video device bypassing the external interface 40. In addition, sending of the ACK signal via the modem unit 20 and the RF unit 10 is requested in step S80. The ACK signal is sent in step S215 after step S111 as shown in FIG. 1 and steps S201 and S215 as shown in FIGS. 2A and 2B.

Figure 3A:
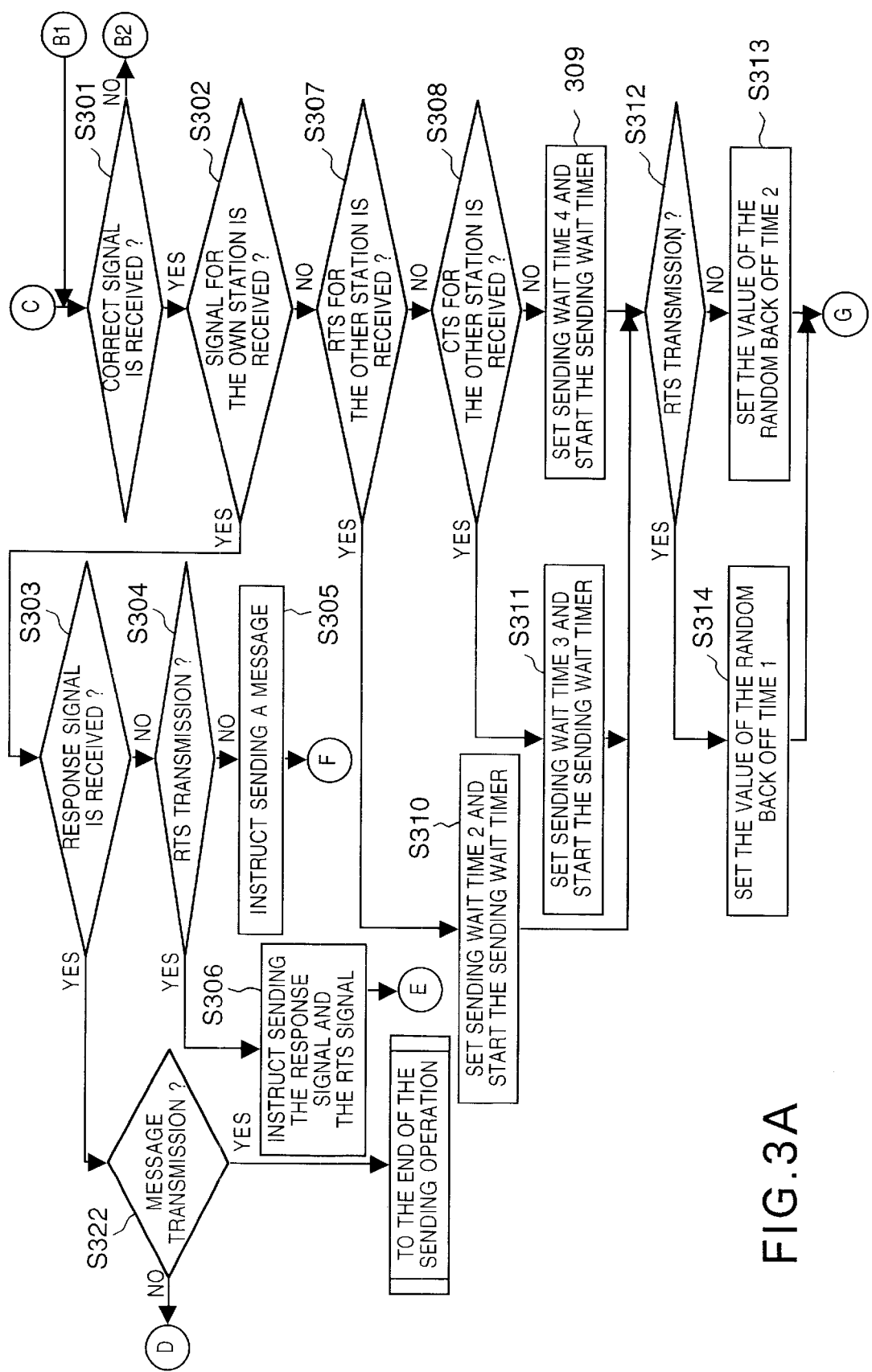
FIGS. 3A and 3B are flowcharts of next sending control after the sending.
Figure 3B:
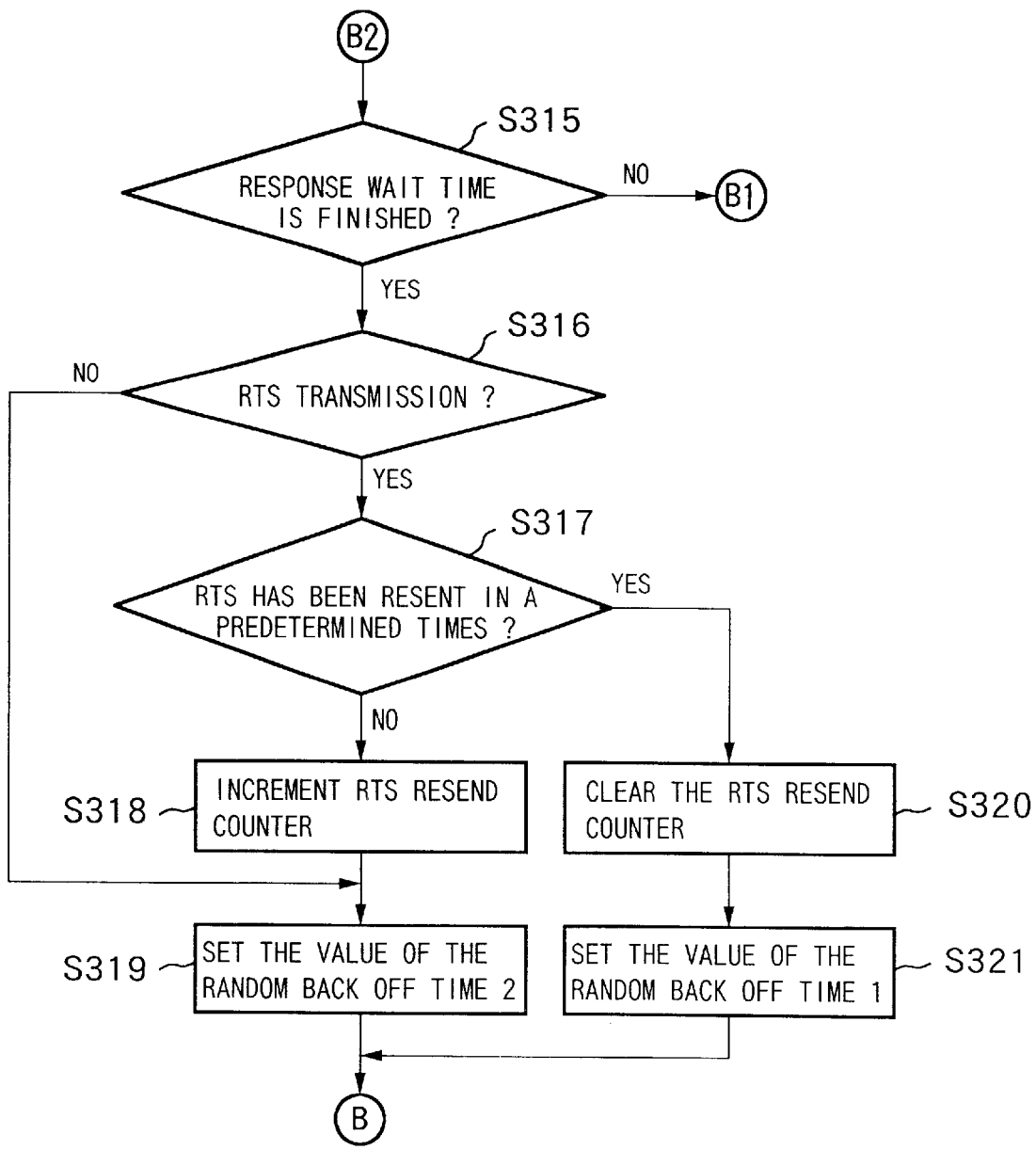

FIGS. 1 to 3 are flowcharts of communication procedure of the data/message transmission control unit 31, and illustrate a part of the program stored in the memory 32. FIGS. 1 and 2 are flowcharts of sending control, while FIGS. 3A and 3B are flowcharts of next sending control after the sending.

This communication operation procedure controls access to the wireless medium by carrier sensing, collision avoidance by random back off procedure, and RTS/CTS procedure. Though the detailed explanation of the procedure is omitted, sending wait time #1 is set for controlling time after sending data frame until sending a new RTS signal, as shown in Step 220 of FIG. 2B. In Step 212, time #2 is set for prohibiting sending operation when receiving the RTS signal of the other station. In Step 213, time #3 is set for prohibiting the sending operation when receiving the CTS signal of the other station. In Step 208, time #4 is set for prohibiting the sending operation when receiving the data frame of the other station. Thus, the access to the communication path is controlled in accordance with the kind of the signal to be sent, so that plural communication apparatuses can perform efficient communication.

Figure 4:
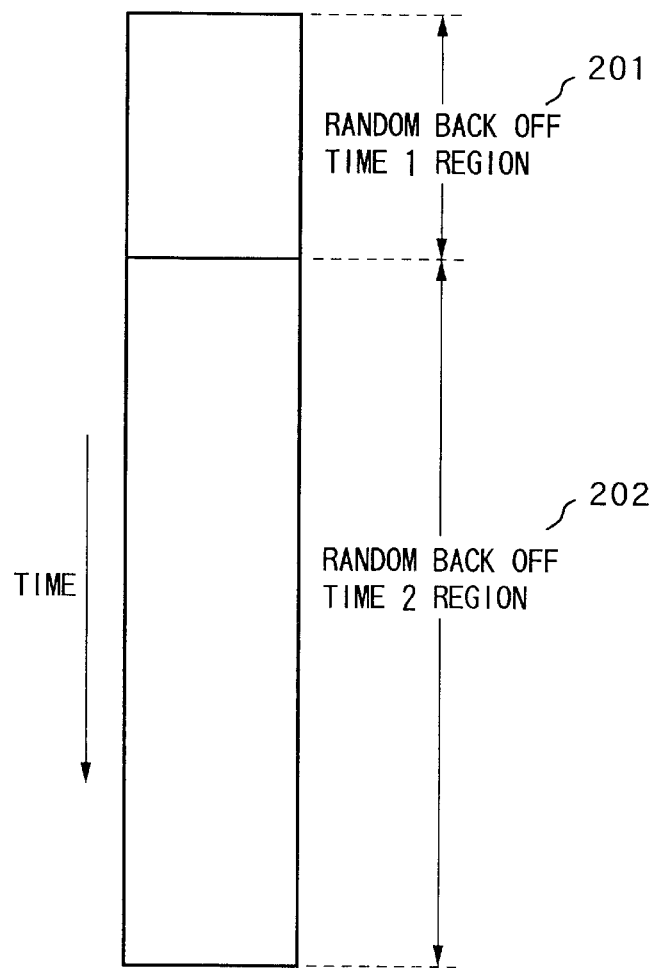
FIG. 4 is a time chart showing a selection width of sending wait time in the random back off procedure used for carrier detection and when collision occurs.

FIG. 4 is a time chart of a selection width of sending wait time in the random back off procedure used for carrier detection and when collision occurs.

Figure 5:
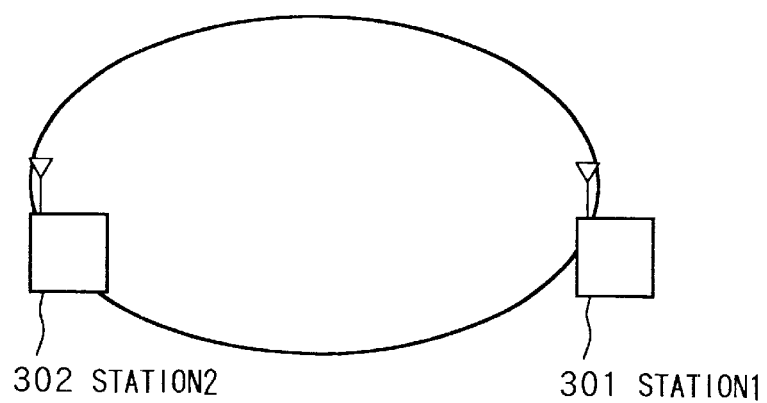
FIG. 5 is a location diagram of communication apparatuses when a single system exists.
Figure 6:
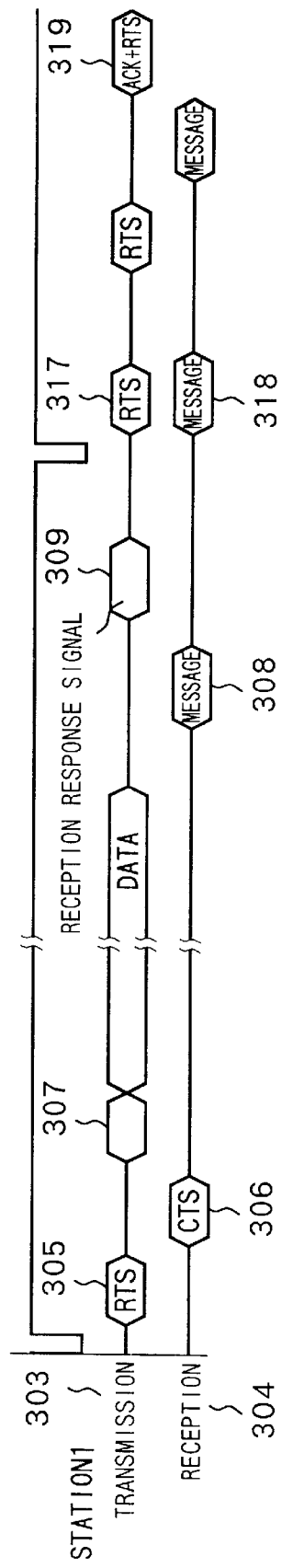
FIG. 6 is a timing chart showing the sending and receiving operation of one of the communication apparatuses such as shown in FIG. 5.
Figure 7:
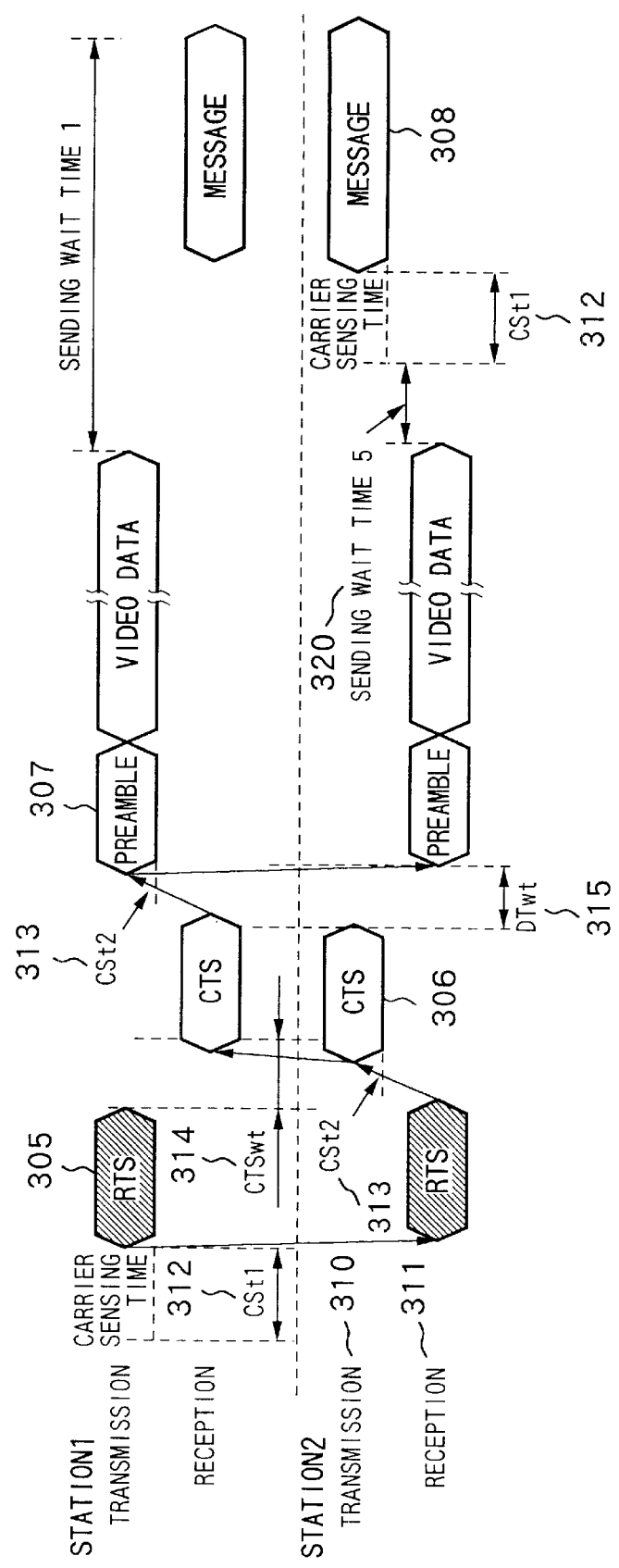
FIG. 7 is a timing chart showing carrier sensing time control and sending wait time control in accordance with the embodiment of the present invention.
Figure 8:
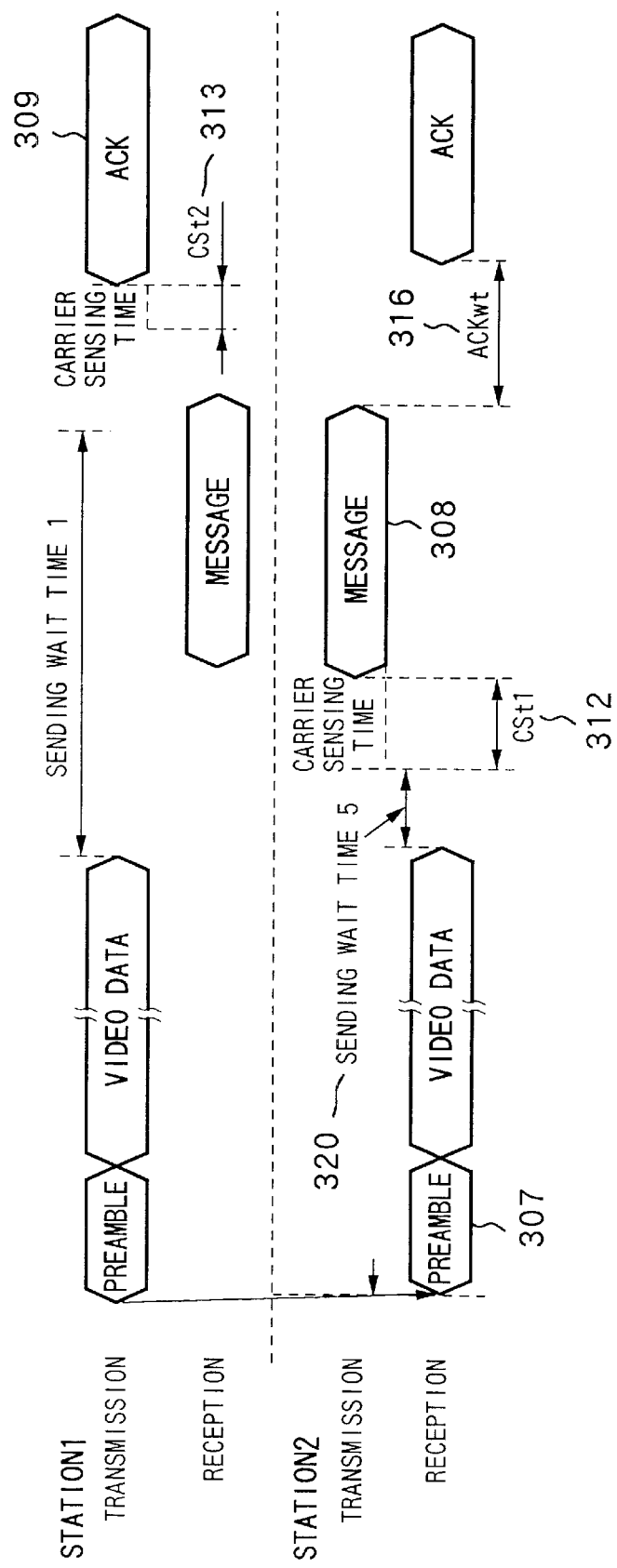
FIG. 8 is a timing chart showing carrier sensing time control and sending wait time control in accordance with the embodiment of the present invention.
Figure 9:
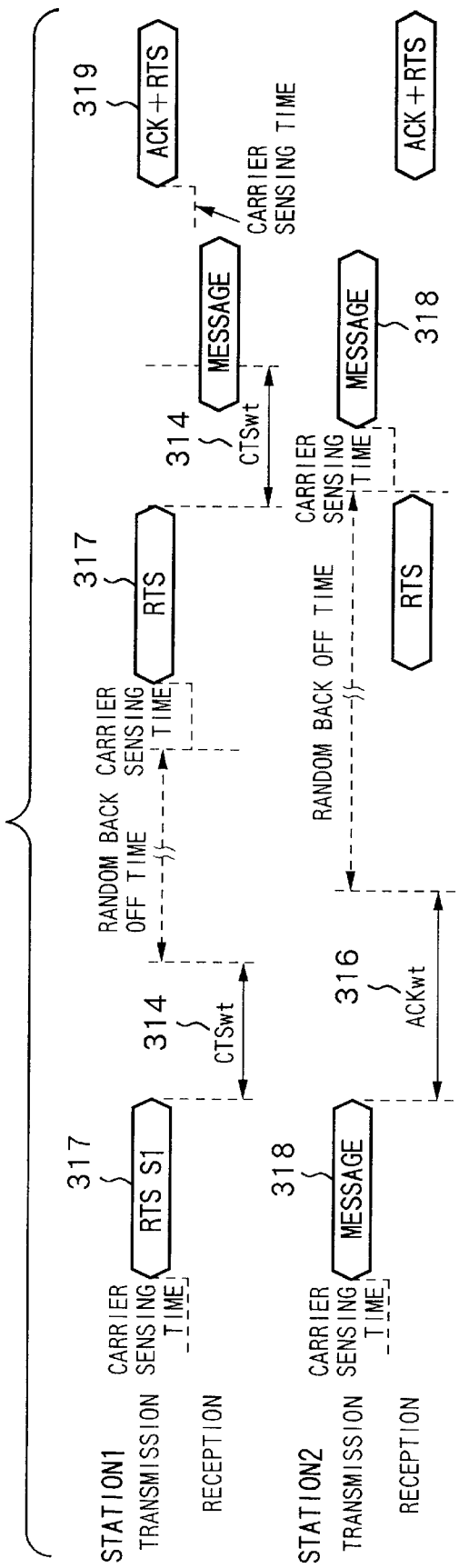
FIG. 9 is a timing chart showing the control performed when a collision occurs between the communication apparatuses such as shown in FIG. 5.

FIG. 5 is a location diagram of communication apparatuses 301 and 302 when a single system exists. FIG. 6 is a timing chart of the sending and receiving operation of the communication apparatus 301. FIGS. 7 to 9 are flowcharts for explaining the detail of the timing chart shown in FIG. 6 by dividing the timing chart into three parts. FIGS. 7 and 8 have an overlapped part. FIGS. 7 and 8 are timing charts of carrier sensing time control and sending wait time control in accordance with the embodiment of the present invention. FIG. 9 is a timing chart of the control performed when a collision occurs between the communication apparatuses 301 and 302.

Figure 10:
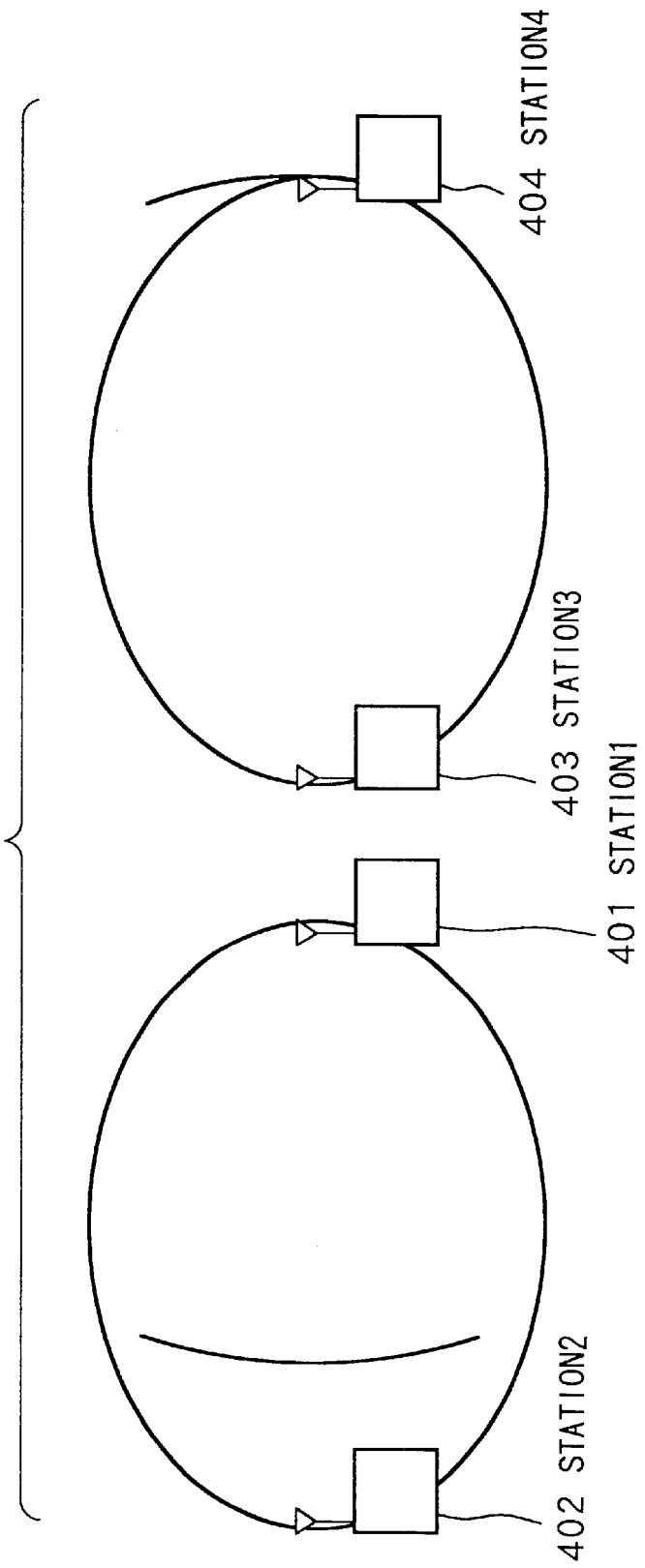
FIG. 10 is a location diagram of communication apparatuses when a hidden terminal exists between two systems.
Figure 11:
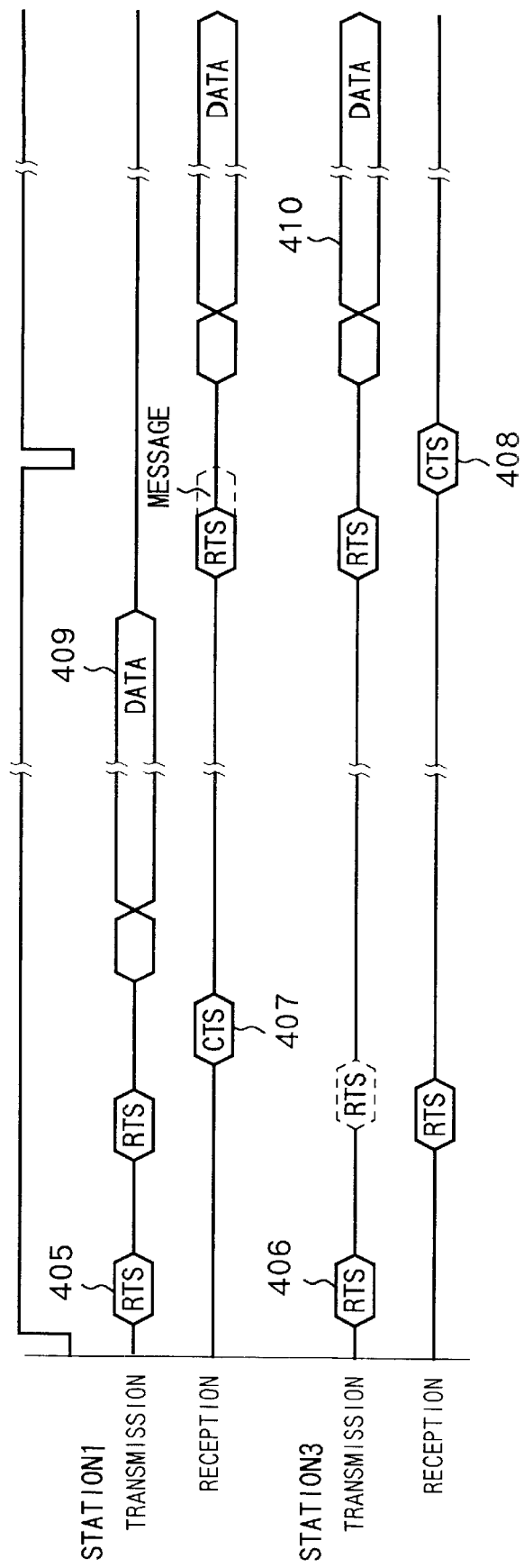
FIG. 11 is a timing chart of signal sending and receiving operation when the neighboring communication apparatuses send image data.
Figure 12:
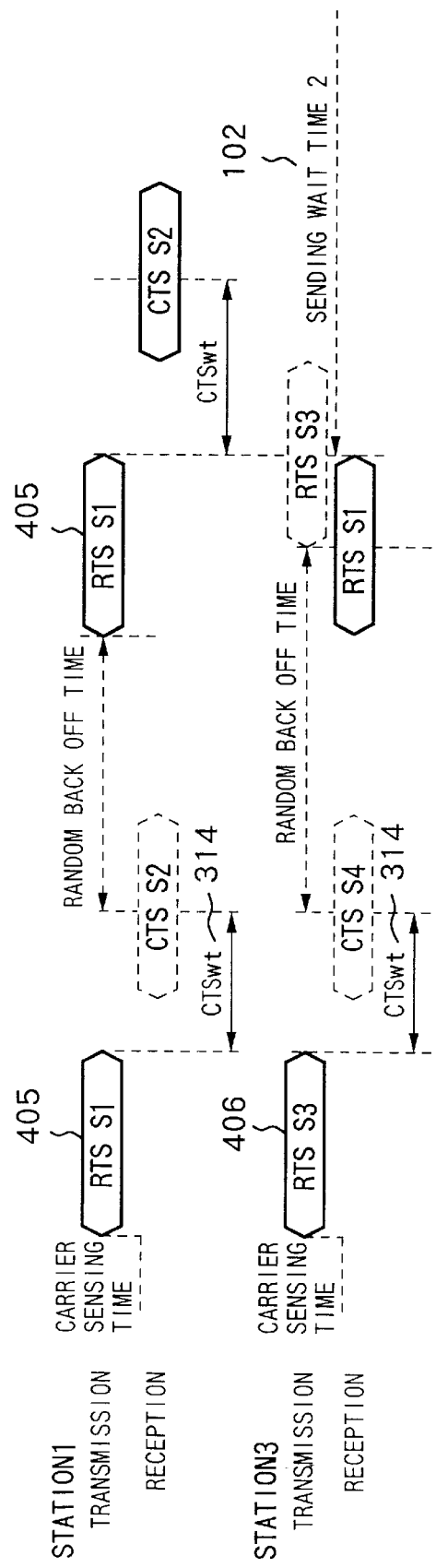
FIG. 12 is a timing chart of carrier sensing time control and sending wait time control under the condition such as shown in FIG. 11.
Figure 13:
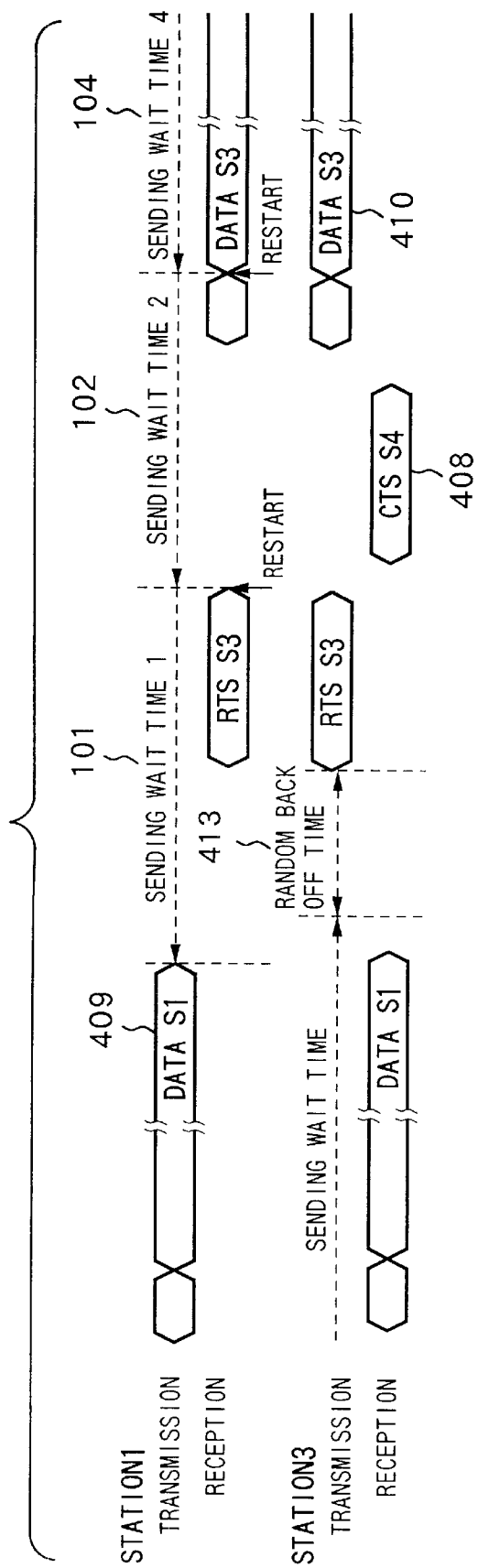
FIG. 13 is a timing chart of carrier sensing time control and sending wait time control under the condition such as shown in FIG. 11.
Figure 14:
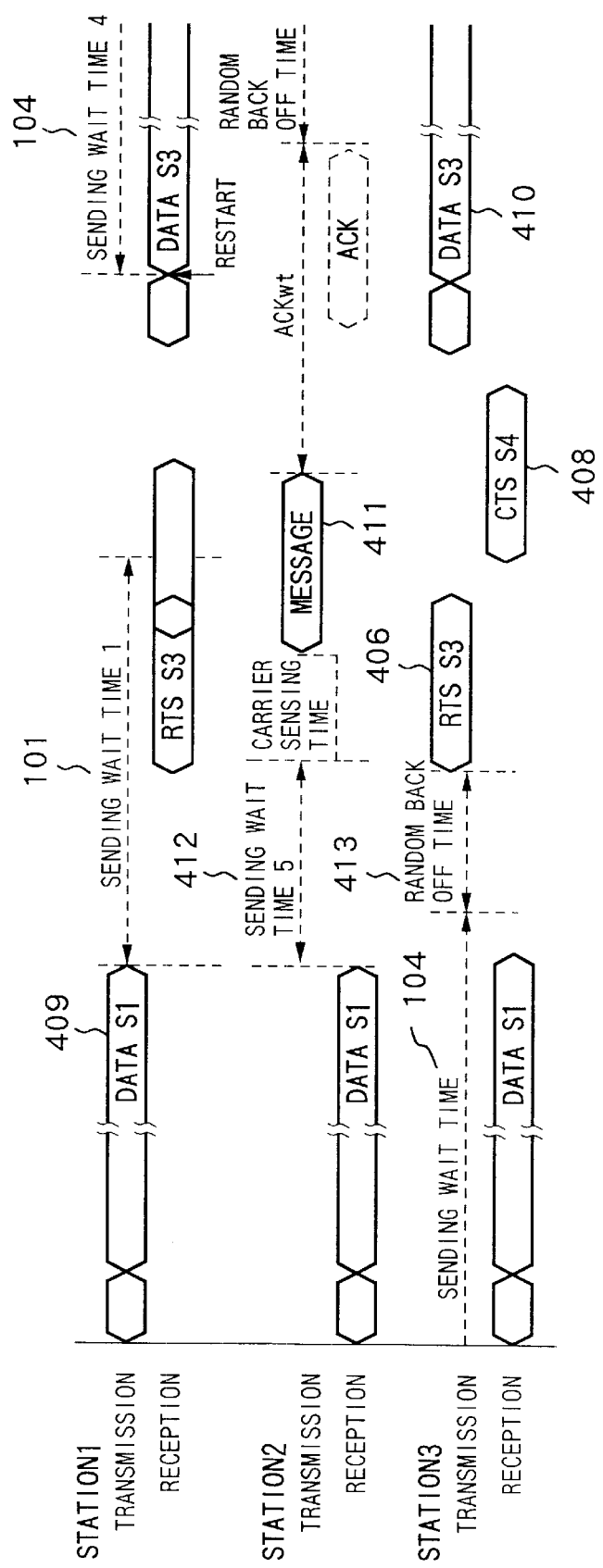
FIG. 14 is a timing chart of carrier sensing time control and sending wait time control under the condition such as shown in FIG. 11.
Figure 15:
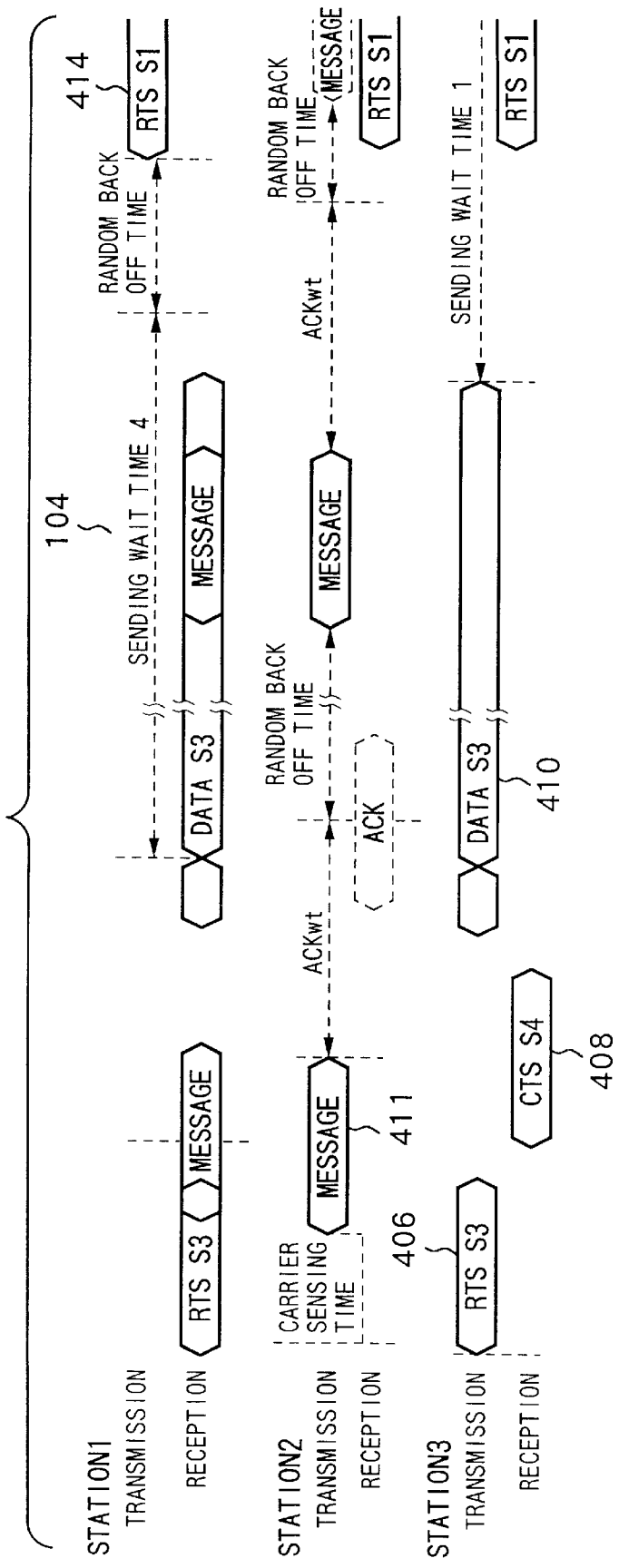
FIG. 15 is a timing chart of carrier sensing time control and sending wait time control under the condition such as shown in FIG. 11.
Figure 16:
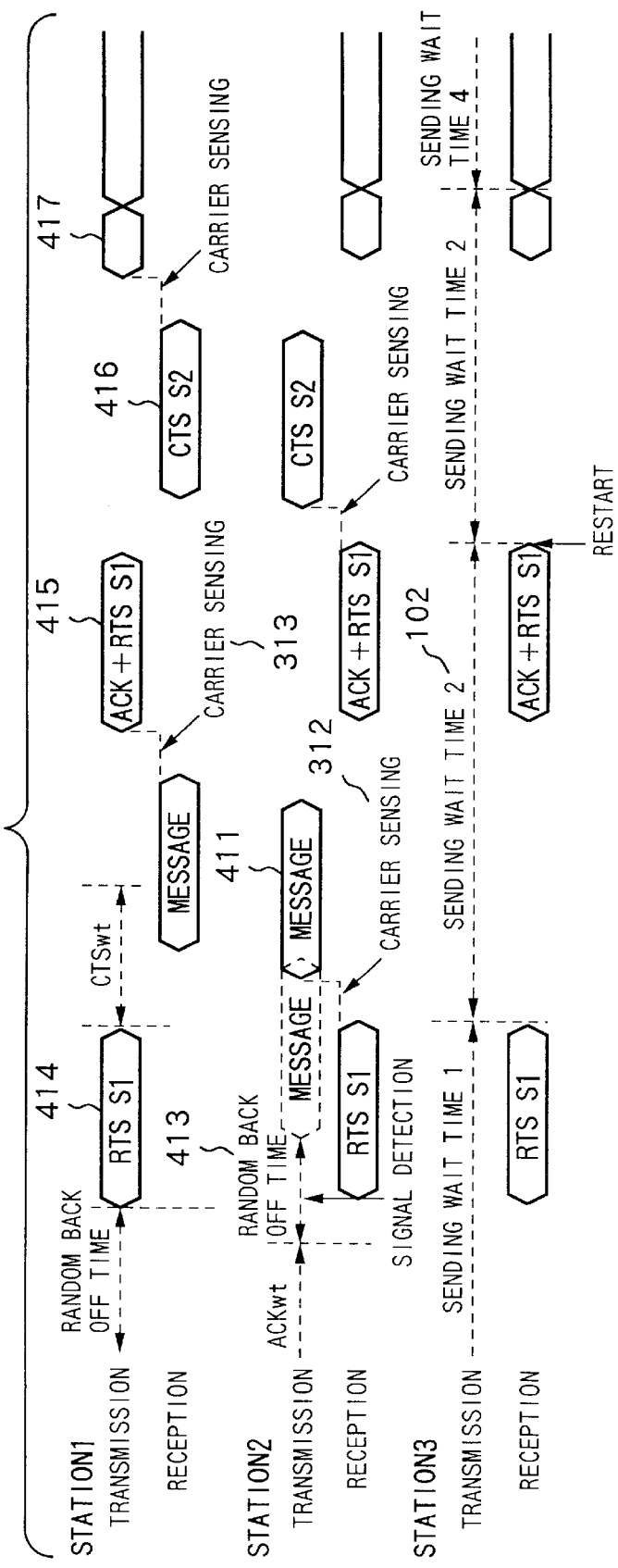
FIG. 16 is a timing chart of carrier sensing time control and sending wait time control under the condition such as shown in FIG. 11.
Figure 17:
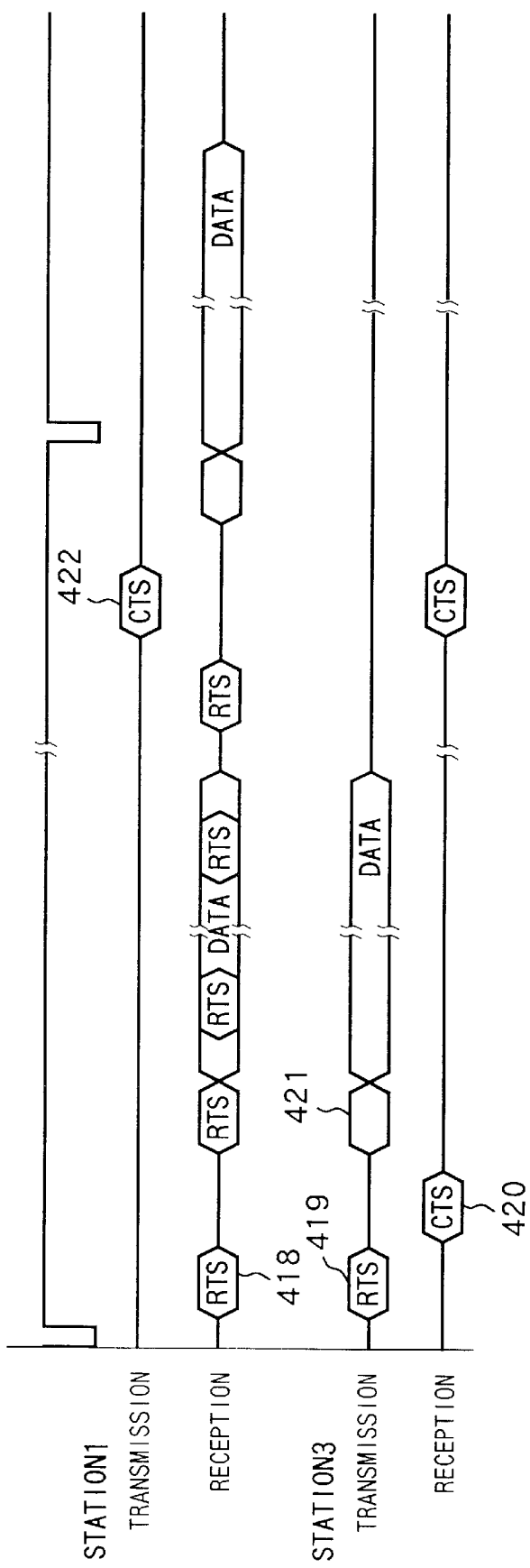
FIG. 17 is a timing chart of signal sending and receiving operation when the communication apparatuses, which are hidden from each other, send image data.
Figure 18:
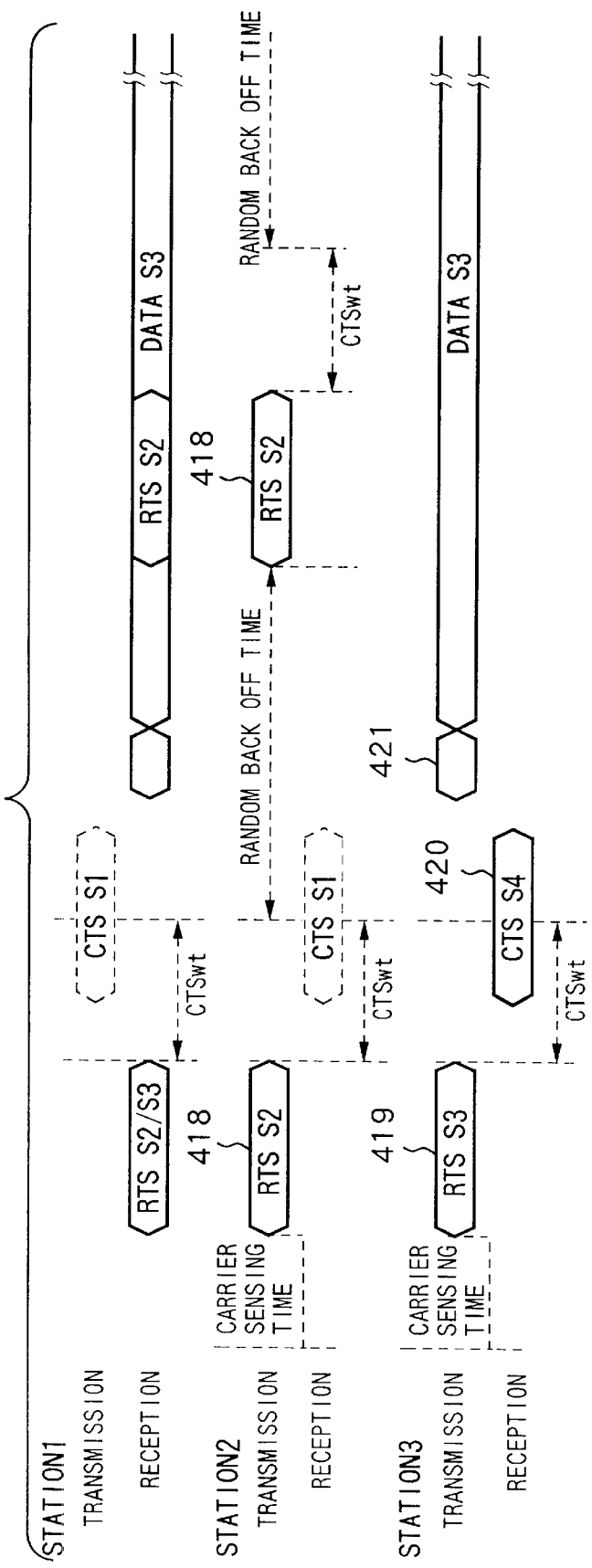
FIG. 18 is a timing chart of carrier sensing time control and sending wait time control under the condition such as shown in FIG. 17.
Figure 19:
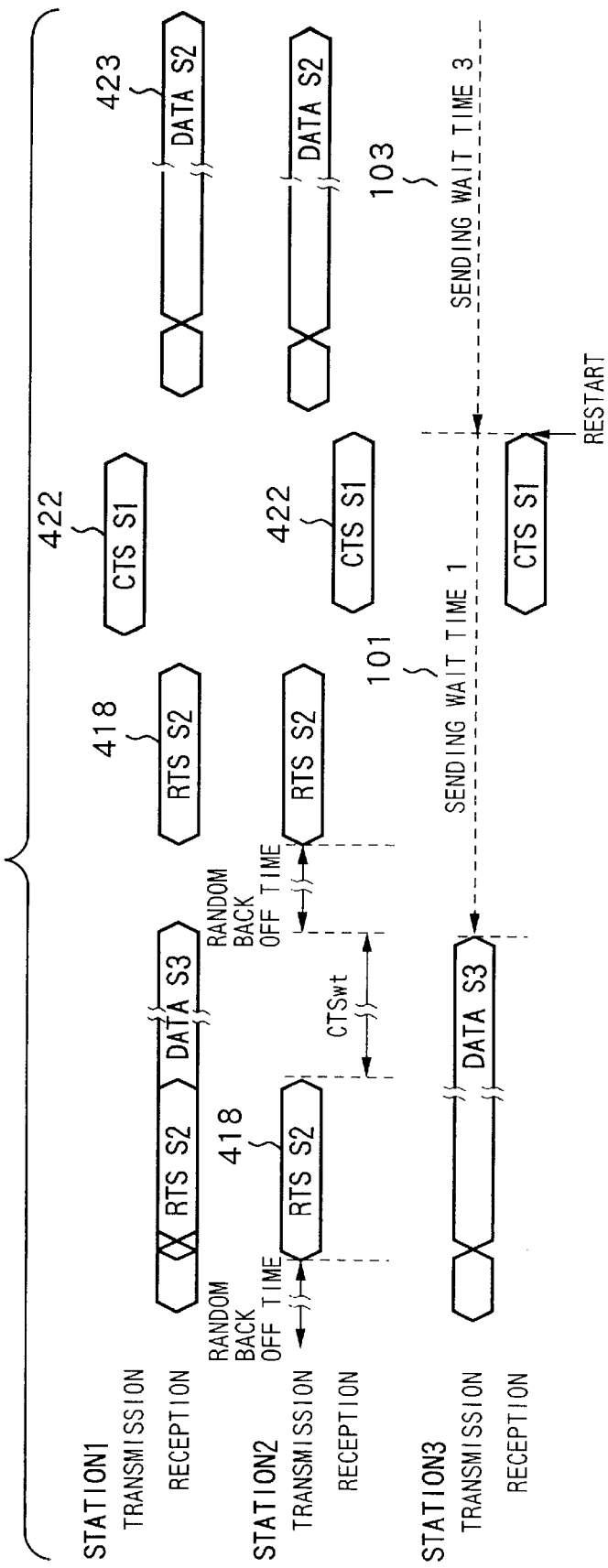
FIG. 19 is a timing chart of carrier sensing time control and sending wait time control under the condition such as shown in FIG. 17.
Figure 20:
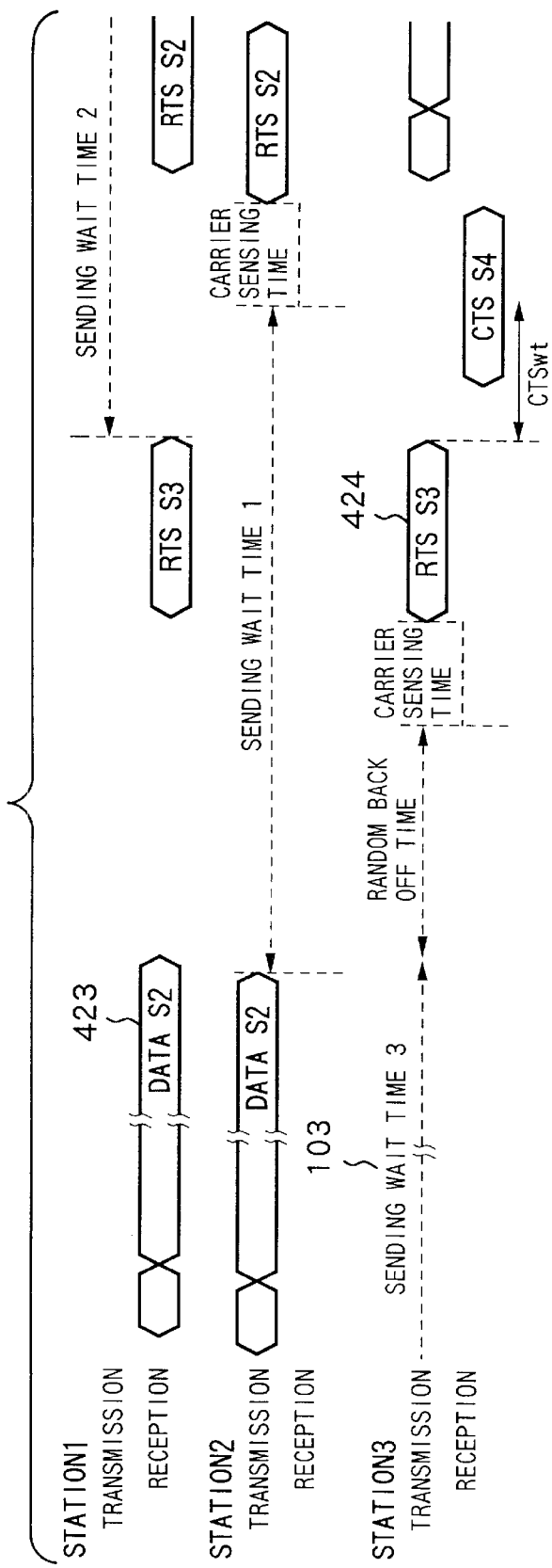
FIG. 20 is a timing chart of carrier sensing time control and sending wait time control under the condition such as shown in FIG. 17.

FIG. 10 is a location diagram of communication apparatuses when a hidden terminal exists between two systems. FIG. 11 is a timing chart of signal sending and receiving operation when the neighboring communication apparatuses 402 and 403 send image data. FIGS. 12 to 16 are timing charts of carrier sensing time control and sending wait time control under the condition shown in FIG. 11. FIGS. 12 and 13 show the detail of FIG. 11. FIG. 15 is a flowchart continuing that shown in FIG. 14. FIG. 16 is a flowchart continuing that shown in FIG. 15. FIGS. 14 and 15 have an overlapped part. FIGS. 15 and 16 also have an overlapped part. FIG. 17 is a timing chart of signal sending and receiving operation when the communication apparatuses 402 and 403, which are hidden from each other, send image data. FIGS. 18 to 20 are timing charts of carrier sensing time control and sending wait time control under the condition shown in FIG. 17. FIGS. 18 and 19 show the detail of FIG. 17. FIG. 20 is a flowchart continuing that shown in FIG. 19.

In FIG. 4, numeral 201 denotes random back off time region #1, and numeral 202 denotes random back off time region #2. Any time in each time region can be selected and can be set as the random back off time.

In FIGS. 5 to 9, numerals 301 and 302 denote communication apparatuses that have the control procedure in accordance with the embodiment of the present invention. Numeral 303 denotes transmission signal of the communication apparatus and numeral 304 denotes reception signal. Numerals 305 and 317 denote the request to send (RTS) signal, numeral 306 denotes the clear to send (CTS) signal. Numeral 307 denotes the data frame. Numerals 308 and 318 are messages. Numeral 309 denotes reception response signal (ACK). Numeral 319 denotes a combination signal of the ACK signal and the RTS signal.

Numeral 310 denotes the sending signal of the communication apparatus 302 and numeral 311 denotes the received signal. Numeral 312 denotes carrier sensing time (CSt1) for sensing if the carrier exists or not in the wireless medium before sending the RTS signal 305 and the message 308. Numeral 313 denotes the time (CSt2) for sensing carrier before sending the CTS signal 306, the data frame 307 and the ACK signal 309. Numeral 314 denotes CTS waiting time (CTSwt) for waiting reception of the CTS signal 306. This CTS waiting time is set longer than the sum of the twice delay time for signal propagation in the transmittable distance, receiving process time of the RTS signal 305 and the sending process time of the CTS signal 306 (including the carrier sensing time 313).

Numeral 315 denotes data frame reception waiting time (DTwt), which is set longer than the sum of the propagation delay time, the process time of the CTS signal 306 and the sending process time of the data frame 307 in the same way as for the time CTSwt 314, after sending the CTS signal 306. Numeral 316 denotes ACK waiting time (ACKwt) for waiting reception of the ACK signal 309 after sending a message 308, which is set in the same way as mentioned above. If the signal to be received in each waiting time is not received, the sending side considers that the sent signal caused a collision, and performs a predetermined process. Numeral 320 denotes sending wait time that determine the timing for sending a message when the message to be sent exists after receiving the data frame 307. This wait time is applied only to sending a message after receiving a data frame.

In FIGS. 10 to 16, numerals 401, 402, 403 and 404 are communication apparatuses performing the control procedure in accordance with the embodiment of the present invention. The communication apparatuses 401, 402, 403 and 404 are located as a system so that they communicate each other. The data and message communication among the communication apparatuses is restricted by ID or address control. Numeral 405 and 414 are the RTS signals sent by the communication terminal 401. Numeral 406 is the RTS signal sent by the communication terminal 403. Numerals 407 and 416 are the CTS signal sent by the communication terminal 402. Numeral 408 is the CTS signals sent by the communication terminal 404. Numerals 409 and 417 are the data frames sent by the communication terminal 401. Numeral 410 is the data frame sent by the communication terminal 403. Numeral 411 is the message sent by the communication terminal 402. Numeral 415 is the signal sent by the communication terminal 401, and is the RTS signal including the ACK signal.

In FIGS. 17 to 20, reference numeral 418 denotes the RTS signal sent by the communication terminal 402. Numerals 419 and 424 are the RTS signals sent by the communication terminal 403. Numeral 420 denotes the CTS signal sent by the communication terminal 404. Numeral 421 denotes the data frame sent by the communication terminal 403. Numeral 422 denotes the CTS signal sent by the communication terminal 401. Numeral 423 denotes the data frame sent by the communication terminal 402.

Hereinafter, a specific operation will be explained along the procedure in the normal case where a pair of communication apparatuses exists and in the case where two pair of communication apparatuses exists.

First, the case where a pair of communication apparatuses exists will be explained with reference to FIG. 5. When the communication terminal 301 sends a data frame to the communication terminal 302, the RTS signal 305 is sent. As shown in steps S108 of FIG. 1, S201 and S215 in FIGS. 2A and 2B via "NO" of step S101 and "NO" of step S102 in FIG. 1, the communication terminal 301 performs carrier sensing to monitor the state of the wireless medium for the period of CSt1 312 before sending the RTS signal 305 as shown in FIG. 7. If the carrier has not been detected for the carrier sensing time 312, the RTS signal 305 is sent in steps S216 and S217 shown in FIG. 2B, followed by setting the CTS signal reception waiting time 314 in the inner timer as shown in step S221 via "NO" of step S218 and "NO" of step S219, so as to wait the reception of the CTS signal 306 for the waiting time 314 in steps S301 and S315 shown in FIGS. 3A and 3B.

On the other hand, the communication apparatus 302 that received the RTS signal 305 starts to send the CTS signal 306 right after confirming that the RTS signal 305 is for the own station. In this operation of sending the CTS signal 306, the carrier sensing is performed for the time CSt2 313 in step S111 of FIG. 1 and steps S201 and S215 of FIGS. 2A and 2B via "YES" of step S101 in FIG. 1 so as to monitor the state of the wireless medium. If the carrier has not been detected for the carrier sensing time 313, the CTS signal 306 is sent promptly in steps S216 and S217, the sending operation is finished through "NO" of step S218 and "YES" of step S219, and the data frame reception waiting time 315 is set in the inner timer so as to wait the reception of the data frame 307 for the waiting time 315. If any signal is detected and become carrier busy state, the sending operation of the CTS signal 306 should be stopped through steps S201 and S202, the sending operation is finished through "NO" of step S209 and "NO" of step S210, and the sending operation is not restarted until receiving a new signal for the own station. If the data frame is not received after sending the CTS signal 306 and after the data frame reception waiting time 315 has passed, the reception waiting state is released, and the communication apparatus 302 start the sending operation if there is any information to be sent.

The communication apparatus 301 that received the CTS signal 306 confirms that the CTS signal is for the own station in steps S301 and S302 as shown in FIG. 3A, and start the sending operation of data frame 307 promptly after "YES" of step S303 and "NO" of step 322. In the data frame sending operation, carrier sensing is performed for the CSt2 time 313 in step S111 of FIG. 1 and steps S201 and S205 of FIG. 2A, in the same way as the sending operation of the CTS signal 306 mentioned above. If the carrier has not been detected for the period, sending operation of the data frame 307 is started in step S216. If the carrier was detected in the carrier sensing time 313, the communication apparatus 301 stops the sending operation in step S202. If the detected carrier was confirmed to be for the signal sent for the own station in steps S203 and S204, reception process is performed. Otherwise, the RTS signal sending procedure is restarted via step S214 or S211, and the data frame is sent.

When the sending operation of the data frame 307 is finished in step S217, as shown in "YES" of step S218 and step S220, the communication apparatus 301 sets the sending wait time #1 in the sending wait timer, starts the timer, and enter the reception waiting state after finishing sending operation.

On the other hand, if the communication apparatus 302 that received the data frame 307 from the communication apparatus 301 has a message to be sent, as shown in FIG. 8, the communication apparatus 302 waits sending for the sending wait time 320 that is longer than the maximum time of the random back off time region 201 in step S104 via "NO" of step S101, "NO" of step S102, and "YES" of step S103 in FIG. 1, after receiving the data frame 307. After passing of this time, the message sending operation starts promptly. As mentioned above, the message includes a control command such as a zooming command for the video camera and a warning command indicating a little remaining power of a battery of the video camera, and others, for example. In this embodiment, the sending wait time 320 is used only for the message sending right after receiving a data frame 307. However, the same effect can be obtained if the sending wait is performed for this period after receiving the ACK signal. In this case, since the sending operation is not performed for the period-of sending wait time 320 when starting the sending operation of the new message 318 after the normal sending and receiving operation of the-message 308, probability of collision with the RTS signal 317 is reduced. However, in the case where the control of the sending wait time 320 is inserted after receiving the ACK signal, when the RTS signal 317 is received in this period, the message sending operation is stopped and the CTS signal is sent.

The sending operation of the message 308 is performed in the same way as for the RTS signal-sending operation mentioned above. First, as shown in step S108 of FIG. 1, steps S201 and S215 of FIGS. 2A and 2B, carrier sensing is performed for the period of time CSt1 312 to monitor the state of the wireless medium. If the carrier has not been detected for the carrier sensing time 312, message 308 is sent in step S216 and then ACK signal reception wait time 316 is set in the inner timer as shown in step S221 via "NO" of step S218 and "NO" of step S219, followed by waiting reception of the ACK signal 309 for this period as shown in steps S301 and S315 in FIGS. 3A and 3B.

The communication apparatus 301 that received the message 308 checks the destination of the received signal. If the received signal is for the own station, the communication apparatus 301 start to send the-ACK signal. In the ACK signal sending operation, the communication apparatus 301 checks if it is in the sending wait time #1 or not, as shown in step S109 in FIG. 1 after "YES" of step S101. If it is in the sending wait time #1, the sending wait timer is reset in step S110, and carrier sensing is performed for period of the time CSt2 313 in step S111 and steps S201 and S215 in FIGS. 2A and 2B. Then, if the carrier has not been detected for the period of carrier sensing time 313, the communication apparatus 301 sends the ACK signal 309 in step S216, finishes the series of sending operation and enters the state in which a new data frame can be sent. The communication apparatus 302 that received the ACK signal 309 finishes the sending operation through steps S301, S302, S303 and "YES" of step S322.

Next, the operation when collision occurs will be explained with reference to FIG. 9. When the communication apparatus 302 that normally finished the sending operation of the message 308 restarts the sending operation to send the message 318 and the communication apparatus 301 starts to send the RTS signal 317 at the same time for sending a new data frame, since the carrier sensing time 312 for sending the RTS signal 317 and the carrier sensing time 312 for sending the message 318 are set the same time in step S108 in FIG. 1, each apparatus cannot detect the signal of the other party, so that collision of the signals may occur. When the collision occurs, as shown in FIG. 9, the communication apparatus 301 that sent the RTS signal 317 performs the back off sequence in steps S106 and S107 of FIG. 1 via step S319 of FIG. 3B after passing of the time CTSwt 314 that was set in step S221 of FIG. 2B. In addition, communication apparatus 302 that sent the message 318 judges that collision occurred since the desired ACK signal cannot be received after passing of the time ACKwt 316 that was set in step S221 in FIG. 2B, and performs the back off sequence as shown in steps S106 and S107 in FIG. 1 via step S319 of FIG. 3B.

On this occasion, the communication apparatuses 301 and 302 select time used for the back off sequence at random from the random back off time region 202. Since the time CTSwt 314 is shorter than the time ACKwt 316, the communication terminal 301 that sent the RTS signal 317 starts to resend the RTS signal 317 earlier than the other terminal 302 in steps S216 and S217 of FIG. 2B (it can be opposite depending on the selected value of the back off time). The communication apparatus 302 that received the RTS signal 317 stops the back off procedure after confirming that the RTS signal is for the own station. Then, the communication apparatus 302 performs carrier sensing procedure again in step S108 of FIG. 1 and step S201 of FIG. 2A, etc., and sends the message 318 in steps S216 and S217. The communication apparatus 301 that received the message signal 318 in the period of the time CTSwt 314 sends the ACK+ RTS signal 319 as shown in S215 of FIG. 2B via "NO" of step S303, "YES" of step S304, step S306, step S111 of FIG. 1, and step S201 in FIG. 2A after monitoring for the carrier sensing time 313 in steps S301 and S302. The communication apparatus 302 that received this signal 319 normally finishes sending the message and starts to send the CTS signal.

Next, the case where the carrier is detected in the carrier sensing operation when sending the RTS signal and the message will be explained.

First, if the carrier is detected in step S201 of FIG. 2A, it is judged that the other station is communicating in step S202, and the sending operation is stopped quickly. Then, it is checked in step S203 if this carrier receives the correct signal or not. If the correct signal was not received, a sensing wait time is selected at random from the region of the random back off time 202 in step S211. This time is set as a back off time so as to wait the sending operation for this wait time in steps S106 and S107 in FIG. 1, followed by the carrier sensing operation again as shown in step S108. If the correct signal (the signal in the same system that enables correct judgement of a predetermined information) is received in step S203 of FIG. 2A, the signal is checked if it is for the own station or not in step S204, and reception process starts if the signal was for the own station.

If the carrier detection occurred at the sending time of the RTS signal, and if the received signal was a message, the sending procedure of the ACK+RTS signal is performed as mentioned above, while if the RTS signal was received when sending a message, the sending procedure of a message is performed. In addition, if the message is received when sending a message, the message sending operation is stopped promptly and the ACK signal is sent, followed by performing the message sending procedure including the random back off procedure using the time included in the random back off time region 202.

In this embodiment, in order to simplify the explanation, data frame sending is one way sending. However, the data frame can be sent in bi-directional way. In this case, it is possible to send TRS signal while receiving the RTS signal from the other station. Therefore, the station that sent the RTS signal first takes the priority, while the communication station that received the RTS signal sends the CTS signal, performs a series of data frame sending procedure, and performs the RTS signal sending procedure. On this occasion, the communication station that passed over sending the RTS signal selects the time from the random back off time region 201, and performs the RTS sending procedure after passing of this time.

Next, the operation in the case where two systems exist as shown in FIG. 10, and the neighboring communication apparatus 401 and 403 send data frames as shown in FIGS. 11 to 16, will be explained. In this arrangement, the communication apparatus 402 cannot detect the signal of the communication apparatus 403, and the communication apparatus 404 cannot detect the signal of the communication apparatus 401.

When the communication apparatus 401 and the communication apparatus 403 send the RTS signals 405 and 406 simultaneously, the communication apparatus 401 and the communication apparatus 403 cannot detect the signal of each other as illustrated in FIG. 11, so that a collision occurs. Thus, each of the communication apparatuses 401 and 403 judges that the RTS signals caused collision in step S221 of FIG. 2B and step S315 of FIG. 3B, after passing of the time CTSwt 314, and starts the back off procedure selecting the time at random from the back off time region 202 in step S319 of FIG. 3B and step S106 of FIG. 1.

As shown in FIG. 12, in the back off procedure, if the communication apparatus 401 selects a shorter time than the communication apparatus 403, the communication apparatus 401 performs carrier sensing in step S108 and steps S201 and S215 in FIGS. 2A and 2B after passing of the back off time as shown in step S107 of FIG. 1, and then resends the RTS signal 405 in step S216. On the other hand, the communication apparatus 403 that waits sending for the back off time stops sending operation quickly if the reception of the RTS signal 405 is detected in this period, while it starts carrier sensing operation of step S201 if the RTS signal is not detected in this period. In this carrier sensing operation, if the carrier is detected by the RTS signal 405, the communication apparatus 403 stops the sending operation in step S202 and checks if a normal reception of a signal by the carrier was performed or not in step S203. If the normal reception was performed, the communication apparatus 403 starts to judge the content of the received signal. The communication apparatus 403 that stopped the sending operation in each condition checks if the signal is for the own station or not, and starts reception process if the signal is for the own station.

If the received signal is not for the own station as shown in step S204 of FIG. 2A, the communication apparatus 403 judges the kind of the signal. As shown in FIG. 12, when the RTS signal 405 from the communication apparatus 401 is received in step S205, a predetermined time 102 is set in the sending wait timer in step S212. The sending wait timer is set longer than the maximum time required for sending the data frame 409 after receiving the RTS signal and sending the CTS signal 407. When the CTS signal 407 is received in step S206, the sum of the time required for sending the data frame 409 and the data frame sending time 103 is set in the similar timer in step S213. As shown in FIG. 13, when the data frame 409 is received in FIG. 207, the sending time 104 of just the data frame length is set in the above-mentioned timer in step S208.

After setting the sending wait timer, the operation procedure to be performed after waiting transmission is judged in accordance with the kind of the signal to be sent. If the sending operation start signal is the RTS signal 406 as shown in step S209, the random back off signal is selected from the region 201 in step S214 and is set in the back off timer. If the sending operation start signal is the message as shown in step S210, the random back off time is selected from the region 202 in step S211 and is set in the back off timer. If the sending operation start signal is a response signal, the sending operation is stopped quickly without waiting the back off via "NO" of step S210.

The communication apparatus 401 that resent the RTS signal 405 sends the data frame 409 in the same procedure as in the case of one-to-one connection. Since the communication apparatuses 403 that can disturb the communication between the communication apparatuses 401 and 402 is in the sending wait state by the above-mentioned procedure, the data frame 409 is sent in the same state as in the case of one-to-one connection. After finishing transmission of the data frame 409, the communication apparatus 401 sets the sending wait time 101 in the sending wait timer in step S220 of FIG. 2B, starts the timer, and finishes the sending operation to be in the receiving wait state.

As shown in FIG. 14, after receiving the data frame 409, the communication apparatus 402 waits sending for the sending wait time 412 by the sending wait timer. Then, if the message 411 to be sent exists, the communication apparatus 402 sends a message 411 in accordance with the sending procedure such as shown in steps S103, S104 and S108 of FIG. 1 as well as steps S201 and S215 of FIGS. 2A and 2B, etc.

On the other hand, if the RTS signals 405 and 406 made collision as shown in FIG. 12, the communication apparatus 403 that was in the sending wait state after receiving the RTS signal 405 resent by the communication apparatus 401 and after receiving the data frame 409, waits passing of the sending wait time 104 as shown in step S104 of FIG. 1, further waits sending operation for the selected back off time 413 in step S107, and resends the RTS signal in S216 via a sequential sending procedure shown in step S108 of FIG. 1 and steps S201 and S215 of FIGS. 2A and 2B. Since the back off time 413 that is used for sending the RTS signal 406 is shorter than the sending wait time 412 of the communication apparatus 402, the RTS signal 406 is sent first, which is received by the communication apparatus 404 properly, the CTS signal 408 is sent, and the data frame 410 is sent.

As shown in FIG. 14, the RTS signal 406 sent by the communication apparatus 403 and the message 411 sent by the communication apparatus 402 generate collision on the communication apparatus 401, so that these signals cannot be recognized properly by the communication apparatus 401. Therefore, the sending wait operation and the sending operation of the ACK signal are not performed. Accordingly, the communication apparatus 402 that sent the message signal 411 in step S216 of FIG. 2B starts the back off procedure of step S319 and step S106 in FIG. 1 through "NO" of step S316, as shown in FIG. 15, after passing of the time ACKwt shown in step S315 of FIG. 3B via step S221. Then, the message is resent in step S216 through step S108 and "NO" of step S215 in FIG. 2B, since the signal from the communication apparatus 403 cannot be detected.

Since the communication apparatus 401 that received the signal with the collision cannot judge the received signal correctly, it maintains the sending wait state for the sending wait time 101 set in step S220 of FIG. 2B, and then start to send a new RTS signal 414. When the data frame 410 from the communication apparatus 403 is received in steps S201 and S207 of FIG. 2A via step S108 of FIG. 1, the communication apparatus 401 selects the random back off time from the region 201 in step S214 after step S208, and starts to wait sending for the sending wait time 104 set in step S208, as shown in step S104 of FIG. 1.

After passing of the sending wait time 101, the communication apparatus 401, as shown in FIG. 15, performs carrier sensing in step S108 and step S201 of FIG. 2A after passing of the random back off time in step S107 of FIG. 1, and resends the RTS signal 414 in step S216. As shown in FIG. 16, the communication apparatus 402 that received this signal stops the back off procedure, performs carrier sensing using the carrier sensing time 312, and resends the message 411. On the other hand, the communication apparatus 401 that received the message 411 in the time CTSwt set in step S212 of FIG. 2A as shown in steps S301 and S302 of FIG. 3A stops the sending procedure of the data frame 417 through "YES" of step S304 and step S306, performs the carrier sensing for the carrier sensing time 313 in step S111 of FIG. 1 and steps S201 and S215, sends the signal 415 indicating the ACK signal and the RTS signal in step S216, and waits the reception of the CTS signal 416 again as shown in step S221 to step S301 of FIG. 3A.

In the example shown in FIG. 15, since the random back off time used for sending the RTS signal 414 finishes earlier than that used for sending the message 411 from the communication apparatus, the RTS signal 414 is sent first. However, it is possible to send the message first. In this case, the communication apparatus 401 that received the message 411 sends the signal 415 indicating the ACK signal and the RTS signal, and waits the reception of the CTS signal 416.

The communication apparatus 403 that received the RTS signal 414 sets the sending wait time 102 into the inner counter by the similar procedure as mentioned above so as to wait sending, receives the signal 415 indicating the ACK signal and the RTS signal, and updates the sending wait time 102 again so as to enter the sending wait state.

Next, the operation of the communication apparatuses 402 and 403 sending the data frame in the arrangement of the communication apparatuses as shown in FIG. 10 will be explained with reference to FIGS. 17 to 20. In this condition, the communication apparatuses 402 and 403 cannot detect the RTS signal of each other.

When the communication apparatus 402 and the communication apparatus 403 start to send the RTS signals 418 and 419 simultaneously, as shown in FIG. 18, the RTS signal 418 sent from the communication apparatus 402 and the RTS signal 419 sent from the communication apparatus 403 as shown in step S216 of FIG. 2B through step S108 of FIG. 1 and steps S201 and S215 of FIG. 2B occur collision on the communication apparatus 401, and cannot be received correctly. On the other hand, the communication apparatus 404 correctly receives the RTS signal 419 sent from the communication apparatus 403, so that the communication apparatus 404 sends the CTS signal, which is received by the communication apparatus 403 in step S301 of FIG. 3A via step S221. Then, the communication apparatus 403 enters the sending procedure of the data frame 421 in steps S201 and S215 of FIGS. 2A and 2B via "YES" of step S303, "NO" of step S322, and perform sending operation of the data frame 421 in step S216.

The communication apparatus 402 that did not receive the CTS signal 422 since the RTS signal 418 occurred the collision waits the response signal for the time CTSwt in step S315 of FIG. 3B, selects the time at random from the random back off time region 202 in step S319, and start to wait sending operation for the selected time by the random back off procedure in step S106 of FIG. 1. After passing of the back off time in step S107, the RTS signal 418 is resent in step S216 through step S108 and steps S201 and S215 of FIGS. 2A and 2B. In this period, the communication apparatus 401 start to wait sending operation for the sending wait time 104 while receiving the data frame 421 from the communication apparatus 403. Even if the RTS signal 418 from the communication apparatus 402 is demodulated correctly, the CTS signal 422 is not sent.

The communication apparatus 402 repeats the resending procedure of the RTS signal 418 in step S318 of FIG. 3B, and counts the number of resending times. If the number of times exceeds a predetermined value (e.g., five) without reception of the CTS signal 422 in step S317, the resending counter is cleared in step S320, and selection of the random back off time is changed from the region 202 to the region 201 in step S221, followed by repeating the resending operation of the RTS signal as shown in step S216 via steps S106 and S108 of FIG. 1, and in steps S201 and S215 of FIGS. 2A and 2B. The predetermined number of times in step S317 can be one time.

The communication apparatus 403 that finished sending the data frame 421 sets the sending wait time 101 into the inner timer in step S220 of FIG. 2B in the same way as mentioned above, and enters the sending wait state to finish the sending operation.

As shown in FIG. 19, the communication apparatus 401 sends the CTS signal 422 quickly in step S216 via step S108 of FIG. 1 and steps S201 and S215 when receiving the RTS signal 418 from the communication apparatus 402 after passing of the sending wait time 104 and after finishing the sending operation of the communication apparatus 403. This CTS signal 422 is received by the communication apparatuses 402 and 403. The communication apparatus 403 that received the signal sets the sending wait time 103 into the inner counter and enters the sending wait state.

If the communication apparatus 403 receives a message from the communication apparatus 404 in this sending wait state, communication apparatus 403 does not send the ACK signal, and start to send the RTS signal 424 as shown in FIG. 20 after passing of the sending wait time 103. The communication apparatus 404 that cannot receive the ACK signal responding to the message continues to resend the message electing the back off procedure from the random back off time region 202 in step S319 of FIG. 3B. However, it does not change the random back off time region in accordance with the number of times for resending. When the RTS signal 424 is received from the communication apparatus 403, sending of a message is performed in the same way as mentioned above.

[Variation]

In the above-mentioned embodiment, each sending wait time is fixed. However, if the data length is variable, the RTS signal, the CTS signal and the data frame may include the information indicating the data length, and the time occupied by the wireless medium may be estimated in accordance with this information so as to set the sending wait time. Alternatively, the sending wait time after receiving the RTS signal may be set at the time required until receiving the data frame, and the sending wait time may be set again when the data frame is received. Thus, even if a terminal sending the RTS signal is in the state where it cannot send the data frame (such as the state where the RTS signal is causing the collision in another area), it is possible to restart sending in the communication path that has not been affected, so that the efficiency of using the wireless medium can be improved.

In the above-mentioned embodiment, if the received signal was detected when the response signal is sent, sending operation of the response signal is stopped. However, it is possible to set the reception wait time for the response signal of the message longer than the communication time of one data frame and to select the short random back off time for sending after waiting transmission, so as to avoid resending of unnecessary message signals.

As explained above, according to the present embodiment, access to the transmission path is controlled on the basis of CSMA/CA procedure. The data transmission is performed only by this basic access control if the information content is small. On the other hand, if the information content is large, the communication path securing procedure is performed by sending and receiving the RTS signal and the sending permission signal. In addition, the sending wait time is provided after the data transmission and when receiving the signal of the other station. Thus, when the plural wireless apparatuses exist, data transmission with high efficiency is realized by reducing transmission of unnecessary signal and by decreasing probability of collision, so that an overall throughput can be improved.

In addition, accessibility to the transmission path can be assigned equally by varying the random back off time in accordance with the kind of the signal, the sending wait state and the signal receiving state so that the random back off time meet the communication state and the kind of signal.

The present invention can be applied to a system including plural devices (e.g., a host computer, interface devices, readers and printers) as well as to an apparatus including only one device (e.g., a copying machine or a facsimile).

The object of the present invention can be achieved also by installing a storage medium memorizing program codes of the software for realizing the function mentioned above into the system or the apparatus, so that the computer (CPU or MPU) of the system or the apparatus can read the program codes out of the storage medium and perform the program codes.

In this case, the program code itself that is read out of the storage medium performs the function of the embodiment explained above, and the storage medium is to constitute the present invention.

The storage medium for supplying the program codes may includes a flexible disk, a hard disk, an optical disk, a CD-ROM, a CD-R, a magnetic tape, a non-volatile memory card, and a ROM, for example.

The function of the embodiment mentioned above can be realized not only by the program code that is read out by the computer, but also by an operating system (OS) working on the computer. In this case, the OS may perform a part of the process or the entire process in accordance with the instruction of the program code so as to perform the above-mentioned function.

The function of the embodiment mentioned above can be realized by the following configuration, too. The program codes that is read out of the storage medium may be loaded into a memory of an extension board installed in the computer or of an extension unit connected to the computer. Then, the CPU of the extension board or the extension unit performs a part or all of the process in accordance with the program codes, so as to perform the above-mentioned function.

As explained above, the embodiment of the present invention enables plural communication apparatuses to communicate each other efficiently by controlling the access to the communication path in accordance with the kind of the signal to be sent.

Though the present invention is explained by the above-mentioned preferred embodiment, the present invention is not limited to the embodiment, but can be performed in various embodiments within the scope of the claims.

What is claimed is:

1. A data transmission apparatus comprising:
a judgment circuit for judging whether or not a transmission medium is available;
a transmitter for transmitting a control signal through the transmission medium to request a reception side to receive transmission data, in accordance with a judgment by said judgment circuit; and a receiver for receiving a response signal from the reception side in response to the control signal, wherein said transmitter transmits the transmission data to the reception side if the response signal is received at said receiver, and retransmits the control signal to the reception side after a random back-time if the response signal is not received at said receiver, and wherein one of first and second periods is selected as the random back-off time in accordance with a retransmission number of the control signal, and the second period is selected if the control signal is retransmitted more than a predetermined retransmission number.

2. The apparatus according to claim 1, wherein said transmitter transmits second transmission data without transmitting the control signal.

3. The apparatus according to claim 1, wherein said transmitter transmits the control signal after a time predetermined by a signal received by said receiver through the transmission medium.

4. A data transmission method comprising:

a judgment step of judging whether or not a transmission medium is available;

a first transmission step of transmitting a control signal through the transmission medium to request a reception side to receive transmission data, in accordance with a judgment result in said judgment step;

a reception step of receiving a response signal from the reception side in response to the control signal; and a second transmission step of transmitting the transmission data to the reception side if the response signal is received in said reception step, and retransmitting the control signal to the reception side after a random back-off time if the response signal is not received in said reception step, and wherein one of first and second periods is selected as the random back-off time in accordance with a retransmission number of the control signal, and the second period is selected if the control signal is retransmitted more than a predetermined retransmission number.

5. The method according to claim 4, further comprising a third transmission step of transmitting second transmission data without transmitting the control signal.

6. The method according to claim 4, wherein the control signal is transmitted after a time predetermined by a signal received through the transmission medium.

\* \* \* \* \*

UNITED STATES PATENT AND TRADEMARK OFFICE
CERTIFICATE OF CORRECTION

PATENT NO.     : 6,625,162 B2
DATED          : September 23, 2003
INVENTOR(S)    : Toshihiko Myojo et al.

It is certified that error appears in the above-identified patent and that said Letters Patent is hereby corrected as shown below:

Title page,
Item [57], ABSTRACT,
Line 2, "communicate" should read -- communicate with --.

Figure 22:
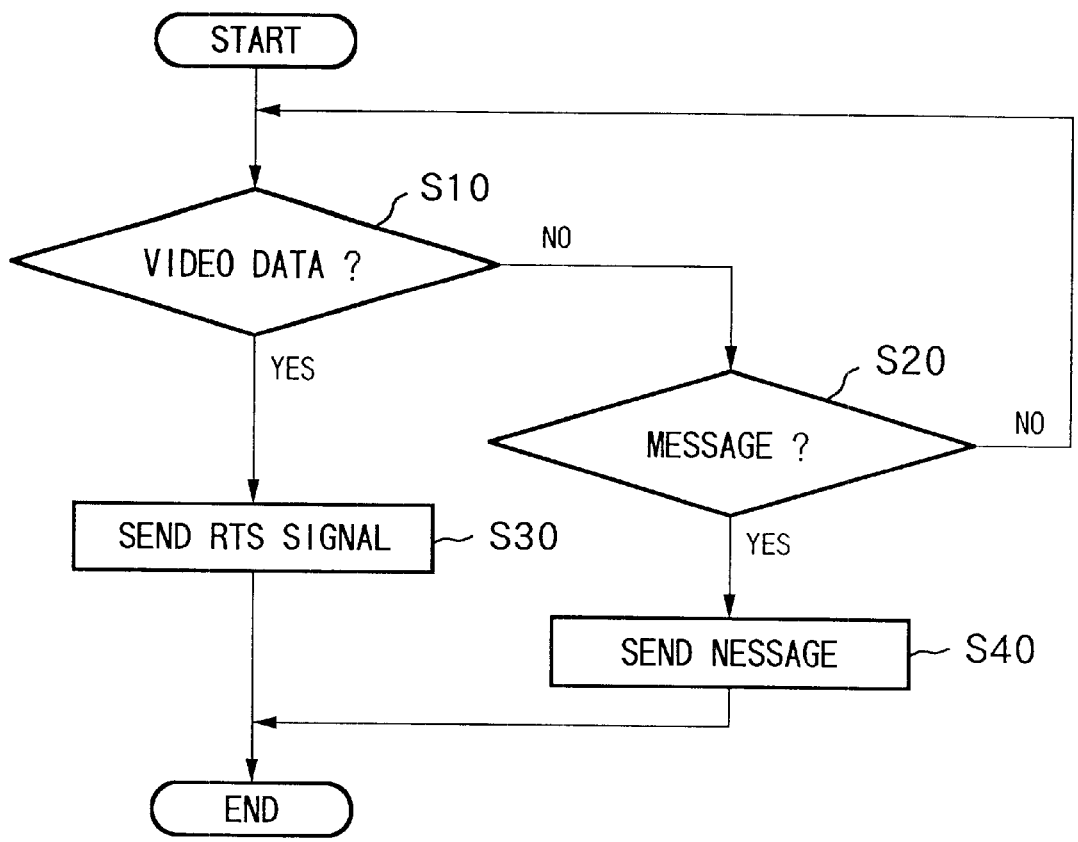
FIG. 22 is a flowchart of the operation when a signal is inputted from the external interface.

Drawings,
Sheet 22, FIG. 21, "TRANSNISSION" should read -- TRANSMISSION --.
Sheet 23, FIG. 22, "NESSAGE" should read -- MESSAGE --.

Column 2,
Line 3, "cate" should read -- cate with --; and
Line 26, "communicate" should read -- communicate with --.

Column 7,
Lines 5 and 19, "wait" should read -- await --;
Line 21, "become" should read -- becomes the --; and
Line 53, "enter" should read -- enters --.

Column 8,
Line 6, "period-of" should read -- period of --; and
Line 8, "the-messge" should read -- the message --.

UNITED STATES PATENT AND TRADEMARK OFFICE
CERTIFICATE OF CORRECTION

PATENT NO.     : 6,625,162 B2
DATED          : September 23, 2003
INVENTOR(S)    : Toshihiko Myojo et al.

It is certified that error appears in the above-identified patent and that said Letters Patent is hereby corrected as shown below:

Column 11,
Lines 23 and 25, "waits" should read -- awaits --;
Line 57, "wait" should read -- await --.

Column 12,
Line 39, "FIG. 2B occur collision" should read -- FIG. 2B, collision occurs --.

Signed and Sealed this

Thirteenth Day of July, 2004

JON W. DUDAS
*Acting Director of the United States Patent and Trademark Office*